US 8,494,257 B2

(12) United States Patent
Taub et al.

(10) Patent No.: US 8,494,257 B2
(45) Date of Patent: Jul. 23, 2013

(54) MUSIC SCORE DECONSTRUCTION

(75) Inventors: Robert Taub, Princeton, NJ (US); George Tourtellot, New York, NY (US)

(73) Assignee: Museami, Inc., Princeton, NJ (US)

( * ) Notice: Subject to any disclaimer, the term of this patent is extended or adjusted under 35 U.S.C. 154(b) by 1003 days.

(21) Appl. No.: 12/371,510

(22) Filed: Feb. 13, 2009

(65) Prior Publication Data

US 2009/0202144 A1 Aug. 13, 2009

Related U.S. Application Data

(60) Provisional application No. 61/028,490, filed on Feb. 13, 2008.

(51) Int. Cl.
*G06K 9/62* (2006.01)
*G06K 9/66* (2006.01)
*G06K 9/00* (2006.01)
*G09B 15/00* (2006.01)

(52) U.S. Cl.
USPC ........... 382/159; 382/113; 382/155; 382/156; 382/157; 382/158; 382/181; 382/309; 382/311; 84/475; 84/600; 84/601; 84/602

(58) Field of Classification Search
USPC ................. 382/159, 113, 155, 156, 157, 158, 382/181, 306, 311; 84/475, 600, 601, 602
See application file for complete search history.

(56) References Cited

U.S. PATENT DOCUMENTS

| | | | |
|---|---|---|---|
| 4,014,237 A | 3/1977 | Milde, Jr. | |
| 4,028,985 A | 6/1977 | Merritt | |
| 4,399,732 A | 8/1983 | Rothschild et al. | |
| 4,479,416 A | 10/1984 | Clague | |
| 4,665,790 A | 5/1987 | Rothschild | |
| 4,895,060 A | 1/1990 | Matsumoto | |
| 4,926,737 A | 5/1990 | Minamitaka | |
| 4,945,804 A | 8/1990 | Farrand | |
| 4,960,031 A | 10/1990 | Farrand | |
| 4,999,773 A | 3/1991 | Clynes | |
| 5,018,427 A | 5/1991 | Uchiyama | |
| 5,020,101 A | 5/1991 | Brotz et al. | |

(Continued)

FOREIGN PATENT DOCUMENTS

| | | |
|---|---|---|
| DE | 10117870 A1 | 10/2002 |
| DE | 102004033829 A1 | 2/2006 |

(Continued)

OTHER PUBLICATIONS

Miyao, et al. "Note Symbol Extraction for Printed Piano Scores using Neural Networks." IEICE Trans. Inf. & Syst.. E79-D.5 (1996): 548-554. Print.*

(Continued)

*Primary Examiner* — Michael A Newman

(74) *Attorney, Agent, or Firm* — Kilpatrick Townsend & Stockton LLP

(57) ABSTRACT

Data set generation and data set presentation for image processing are described. The processing determines a location for each of one or more musical artifacts in the image and identifies a corresponding label for each of the musical artifacts, generating a training file that associates the identified labels and determined locations of the musical artifacts with the image, and presenting the training file to a neural network for training.

26 Claims, 16 Drawing Sheets

U.S. PATENT DOCUMENTS

| | | | |
|---|---|---|---|
| 5,038,658 A | 8/1991 | Tsuruta et al. | |
| 5,270,475 A | 12/1993 | Weiss et al. | |
| 5,292,125 A | 3/1994 | Hochstein et al. | |
| 5,325,423 A | 6/1994 | Lewis | |
| 5,367,117 A | 11/1994 | Kikuchi | |
| 5,488,196 A | 1/1996 | Zimmerman et al. | |
| 5,542,006 A * | 7/1996 | Shustorovich et al. | 382/156 |
| 5,544,228 A | 8/1996 | Wagner et al. | |
| 5,646,361 A | 7/1997 | Morrow | |
| 5,685,775 A | 11/1997 | Bakoglu et al. | |
| 5,695,400 A | 12/1997 | Fennell et al. | |
| 5,704,007 A | 12/1997 | Cecys | |
| 5,728,960 A | 3/1998 | Sitrick | |
| 5,768,350 A | 6/1998 | Venkatakrishnan | |
| 5,792,971 A | 8/1998 | Timis et al. | |
| 5,806,039 A | 9/1998 | Fukada et al. | |
| 5,808,225 A | 9/1998 | Corwin et al. | |
| 5,820,384 A | 10/1998 | Tubman et al. | |
| 5,820,463 A | 10/1998 | O'Callaghan | |
| 5,824,937 A | 10/1998 | Szalay | |
| 5,825,905 A * | 10/1998 | Kikuchi | 382/113 |
| 5,864,631 A * | 1/1999 | Shutoh | 382/113 |
| 5,869,782 A | 2/1999 | Shishido et al. | |
| 5,883,986 A * | 3/1999 | Kopec et al. | 382/310 |
| 5,886,274 A | 3/1999 | Jungleib | |
| 5,929,360 A | 7/1999 | Szalay | |
| 5,942,709 A | 8/1999 | Szalay | |
| 5,982,816 A | 11/1999 | Ogita et al. | |
| 5,983,280 A | 11/1999 | Hunt | |
| 6,067,566 A | 5/2000 | Moline | |
| 6,084,168 A | 7/2000 | Sitrick | |
| 6,121,530 A | 9/2000 | Sonoda | |
| 6,140,568 A | 10/2000 | Kohler | |
| 6,156,964 A | 12/2000 | Sahai et al. | |
| 6,175,872 B1 | 1/2001 | Neumann et al. | |
| 6,188,010 B1 | 2/2001 | Iwamura | |
| 6,201,176 B1 | 3/2001 | Yourlo | |
| 6,212,534 B1 | 4/2001 | Lo et al. | |
| 6,313,387 B1 | 11/2001 | Yamauchi | |
| 6,316,712 B1 | 11/2001 | Laroche | |
| 6,323,412 B1 | 11/2001 | Loo | |
| 6,353,174 B1 | 3/2002 | Schmidt et al. | |
| 6,417,884 B1 | 7/2002 | Chang et al. | |
| 6,423,893 B1 | 7/2002 | Sung et al. | |
| 6,482,087 B1 | 11/2002 | Egozy et al. | |
| 6,545,209 B1 | 4/2003 | Flannery et al. | |
| 6,598,074 B1 | 7/2003 | Moller et al. | |
| 6,653,545 B2 | 11/2003 | Redmann et al. | |
| 6,678,680 B1 | 1/2004 | Woo | |
| 6,703,549 B1 | 3/2004 | Nishimoto et al. | |
| 6,747,201 B2 | 6/2004 | Birmingham et al. | |
| 6,766,288 B1 | 7/2004 | Smith | |
| 6,798,866 B1 | 9/2004 | Tennyson et al. | |
| 6,798,886 B1 | 9/2004 | Smith et al. | |
| 7,050,462 B2 | 5/2006 | Tsunoda et al. | |
| 7,053,291 B1 | 5/2006 | Villa | |
| 7,074,999 B2 | 7/2006 | Sitrick et al. | |
| 7,098,392 B2 | 8/2006 | Sitrick et al. | |
| 7,227,072 B1 | 6/2007 | Weare | |
| 7,230,176 B2 | 6/2007 | Kosonen | |
| 7,254,644 B2 | 8/2007 | Norimatsu et al. | |
| 7,272,551 B2 | 9/2007 | Sorin | |
| 7,277,852 B2 | 10/2007 | Iyoku et al. | |
| 7,288,710 B2 | 10/2007 | Gayama | |
| 7,295,977 B2 | 11/2007 | Whitman et al. | |
| 7,297,858 B2 | 11/2007 | Paepcke | |
| 7,314,992 B2 | 1/2008 | Funaki et al. | |
| 7,323,629 B2 | 1/2008 | Somani et al. | |
| 7,342,167 B2 | 3/2008 | Cremer et al. | |
| 7,368,652 B2 | 5/2008 | Iketani et al. | |
| 7,371,954 B2 | 5/2008 | Masuda et al. | |
| 7,405,355 B2 | 7/2008 | Both et al. | |
| 7,423,213 B2 | 9/2008 | Sitrick | |
| 7,473,838 B2 | 1/2009 | Suzuki et al. | |
| 7,507,899 B2 | 3/2009 | Sumita | |
| 7,534,951 B2 | 5/2009 | Yamashita | |
| 7,544,881 B2 | 6/2009 | Makino et al. | |
| 7,547,840 B2 | 6/2009 | Noh et al. | |
| 7,579,546 B2 | 8/2009 | Sumita | |
| 7,582,824 B2 | 9/2009 | Sumita | |
| 7,589,271 B2 | 9/2009 | Jarrett et al. | |
| 7,615,702 B2 | 11/2009 | Becker et al. | |
| 7,645,929 B2 | 1/2010 | Chang et al. | |
| 7,649,136 B2 | 1/2010 | Uehara | |
| 7,667,125 B2 | 2/2010 | Taub et al. | |
| 7,674,970 B2 | 3/2010 | Ma et al. | |
| 7,732,703 B2 | 6/2010 | Lazovic | |
| 7,767,897 B2 | 8/2010 | Jochelson et al. | |
| 7,774,078 B2 | 8/2010 | Booth et al. | |
| 7,792,353 B2 * | 9/2010 | Forman et al. | 382/159 |
| 7,982,119 B2 | 7/2011 | Taub et al. | |
| 2001/0007960 A1 | 7/2001 | Yoshihara et al. | |
| 2001/0023633 A1 | 9/2001 | Matsumoto | |
| 2002/0007721 A1 | 1/2002 | Aoki | |
| 2002/0091847 A1 | 7/2002 | Curtin | |
| 2003/0089216 A1 | 5/2003 | Birmingham et al. | |
| 2003/0140769 A1 | 7/2003 | Davis et al. | |
| 2003/0164084 A1 | 9/2003 | Redmann et al. | |
| 2003/0188626 A1 | 10/2003 | Kriechbaum et al. | |
| 2004/0040433 A1 | 3/2004 | Errico | |
| 2005/0015258 A1 | 1/2005 | Somani | |
| 2005/0066797 A1 | 3/2005 | Miyamoto et al. | |
| 2005/0086052 A1 | 4/2005 | Shih | |
| 2005/0120865 A1 | 6/2005 | Tada | |
| 2005/0190199 A1 | 9/2005 | Brown et al. | |
| 2005/0234366 A1 | 10/2005 | Heinz et al. | |
| 2006/0050898 A1 | 3/2006 | Yamada et al. | |
| 2006/0065105 A1 | 3/2006 | Iketani et al. | |
| 2006/0065107 A1 | 3/2006 | Kosonen | |
| 2006/0075883 A1 | 4/2006 | Thorne et al. | |
| 2006/0086234 A1 | 4/2006 | Jarrett et al. | |
| 2006/0095254 A1 | 5/2006 | Walker et al. | |
| 2006/0112814 A1 | 6/2006 | Paepcke | |
| 2006/0150803 A1 | 7/2006 | Taub | |
| 2006/0150805 A1 | 7/2006 | Pang | |
| 2006/0219089 A1 | 10/2006 | Funaki et al. | |
| 2007/0012165 A1 | 1/2007 | Noh et al. | |
| 2007/0039449 A1 | 2/2007 | Redmann | |
| 2007/0044639 A1 | 3/2007 | Farbood et al. | |
| 2007/0076534 A1 | 4/2007 | Shih | |
| 2007/0076902 A1 | 4/2007 | Master | |
| 2007/0107584 A1 | 5/2007 | Kim et al. | |
| 2007/0131094 A1 | 6/2007 | Kemp | |
| 2007/0140510 A1 | 6/2007 | Redmann | |
| 2007/0163428 A1 | 7/2007 | Salter | |
| 2007/0193435 A1 | 8/2007 | Hardesty et al. | |
| 2007/0208990 A1 | 9/2007 | Kim et al. | |
| 2007/0214941 A1 | 9/2007 | Kourbatov | |
| 2007/0245881 A1 | 10/2007 | Egozy et al. | |
| 2007/0256551 A1 | 11/2007 | Knapp et al. | |
| 2008/0011149 A1 | 1/2008 | Eastwood et al. | |
| 2008/0060499 A1 | 3/2008 | Sitrick | |
| 2008/0113797 A1 | 5/2008 | Egozy | |
| 2008/0115656 A1 | 5/2008 | Sumita | |
| 2008/0156171 A1 | 7/2008 | Guldi | |
| 2008/0188967 A1 | 8/2008 | Taub et al. | |
| 2008/0190271 A1 | 8/2008 | Taub et al. | |
| 2008/0190272 A1 | 8/2008 | Taub et al. | |
| 2008/0210082 A1 | 9/2008 | Sumita | |
| 2008/0271592 A1 | 11/2008 | Beckford | |
| 2009/0171485 A1 | 7/2009 | Sim et al. | |
| 2009/0178544 A1 | 7/2009 | Reynolds et al. | |
| 2010/0043625 A1 | 2/2010 | Van Geenen et al. | |
| 2010/0132536 A1 | 6/2010 | O'Dwyer | |
| 2010/0216549 A1 | 8/2010 | Salter | |
| 2010/0307320 A1 | 12/2010 | Hoeberechts et al. | |

FOREIGN PATENT DOCUMENTS

| | | |
|---|---|---|
| DE | 102004033867 A1 | 2/2006 |
| EP | 1736961 A | 12/2006 |
| JP | 03249799 A | 11/1991 |
| JP | 05127668 A | 5/1993 |
| JP | 05143064 A | 6/1993 |
| JP | 06027940 A | 2/1994 |
| JP | 2003-187186 A | 7/2003 |
| WO | WO03/005242 A1 | 1/2003 |

| | | | |
|---|---|---|---|
| WO | WO2004/034376 A1 | 4/2004 | |
| WO | WO2004/057495 A1 | 7/2004 | |
| WO | WO2006/066075 A1 | 6/2006 | |

OTHER PUBLICATIONS

Vuillemuier, et al. "Preview of an Architecture for Musical Score Recognition." (1997): 1-15. Print.*

Mu-Chun, et al. "A Neural-Network-Based Approach to Optical Symbol Recognition." Neural Procesing Letters. 15. (2002): 117-135. Print.*

Reiher, et al. "A System for Efficient and Robust Map Symbol Recognition." Proceedings of ICPR. (1996): 783-787. Print.*

Lee, et al. "Neural Networks for Simultaneous Classification and Parameter Estimation in Musical Instrument Control." Adaptive and Learning Systems. 1706. (1992): 244-255. Print.*

Akinwonmi, et al. "Design of a Neural Network Based Optical Character Recognition System for Musical Notes." Pacific Journal of Science and Technology. 9.1 (2008): 45-58. Print.*

Miyao et al. "Note Symbol Extraction for Printed Piano Scores using Neural Networks." IEICE Trans. Inf. & Syst.. E79-D.5 (1996): 548-554. Print.*

Beran et al., "Recognition of Printed Music Score", Lecture Notes in Computer Science, Jan. 1999, pp. 174-179.

International Search Report dated Jul. 31, 2009 from International Application No. PCT/US2009/034149, 3 pages.

"Head and Stem Extraction from Printed Music Scores Using a Neural Network Approach" by H. Miyao et al., in Proceedings of Third International Conference on Document Analysis and Recognition, IEEE Computer Society (1995) at 1074-1079.

"About MyVirtualBand" [Online] Jan. 2, 2007, myvirtualband.com, XP002483896; retrieved from the Internet on Jun. 11, 2008; URL:web.archive.org/web/20070102035042/_www. myvirtualband.com.

"eJamming Features" [Online] Feb. 7, 2007; ejamming.com, XP002483894, retrieved from the Internet: on Jun. 11, 2008; URL:web.archive.org/web/20070207122807/www.ejamming.com.

"Ninjam—Realtime Music Collaboration Software" [Online] Feb. 14, 2006; ninjam.org, XP002483895, retrieved from the Internet on Jun. 11, 2008; URL:web.archive.org/web20060214020741/ninjam.org.

Brossier, Paul M., et al. "Fast labeling of notes in music signals", ISMIR 2004, Oct. 14, 2004, Barcelona, Spain; Abstract, Sections 2 and 3.

Brossier Paul M., et al. "Real-time temporal segmentation of note objects in music signals", ICMC 2004, Nov. 6, 2004, Miami, Florida; Abstract, Sections 2 and 3.

Ghias, Asit, et al. "Query by Humming", *Proceedings of ACM Multimedia '95 San Francisco*, Nov. 5-9, 1995, pp. 231-236; XP000599035.

Hori, T., et al. "Automatic Music Score Recognition/Play System Based on Decision Based Neural Network", *1999 IEEE Third Workshop on Multimedia Signal Processing* (Cat. No.99TH8451: 183-4.

International Search Report dated Aug. 8, 2008 from International Application No. PCT/US2008/054030, 3 pages.

International Search Report dated Feb. 17, 2009 from International Application No. PCT/US2008/052859, 5 pages.

International Search Report dated Jun. 24, 2008 from International Application No. PCT/US2008/054024, 3 pages.

International Search Report dated May 31, 2006 from International Application No. PCT/US2005/045580, 3 pages.

McNab, Rodger J., et al. "Signal Processing for Melody Transcription", *Proceedings of the 19th Australasian Computer Science Conference*, Melbourne, Australia, Jan. 31-Feb. 2, 1996, vol. 18(1)301-207.

Nagoshi, Yasuo, et al. "Transcription of Music Composed of Melody and Chord Using Tree-structured Filter Banks", *Proceedings of the IASTED International Conference Signal and Imaging Processing* Aug. 13-16, 2001 Honolulu, Hawaii, pp. 415-419.

Su, M., et al "A Neural-Network-Based Approach to Optical Symbol Recognition", *Neural Processing Letters* (2002) 15:117-135.

Thalman, Florian, et al. "Jam Tomorrow: Collaborative Music Generation in Croquet Using OpenAI", *Proceedings of the Fourth International Conference on Creating, Connecting and Collaborating through Computing* (C5'06), Jan. 1, 2006, pp. 73-78.

Velikic, Gordana, et al, "Musical Note Segmentation Employing Combined Time and Frequency Analyses", *Acoustics, Speech, and Signal Processihg, 2004, Proceedings* (2004) vol. 4:277-280.

\* cited by examiner

(outlier)

MUSIC SCORE DECONSTRUCTION

CROSS-REFERENCES TO RELATED APPLICATIONS

This application claims the benefit of priority of U.S. Provisional Patent Application Ser. No. 61/028,490 entitled "Music Score Deconstruction" to Robert Taub and George Tourtellot filed Feb. 13, 2008. Priority of the filing date of Feb. 13, 2008 is hereby claimed, and the disclosure of the Provisional Patent Application is hereby incorporated by reference.

BACKGROUND

Neural networks can be used to process an optically captured image of a music score and produce a digital representation of the corresponding musical notes, from which audio can be synthesized. Such processing provides an "OCR" (optical character recognition) function for sheet music. See, for example, U.S. patent application Ser. No. 11/303,812 entitled "System and Method for Music Score Capture and Synthesized Audio Performance with Synchronized Presentation" to Robert D. Taub, filed Dec. 15, 2005.

A neural network receives input and processes it to make a decision or draw a conclusion about the input data. The input data includes samples or constituent parts relating to the decision or conclusion. A set of neural network nodes, which may be organized in multiple layers, receives and performs computation on the input. The output of the neural network comprises a set of values that specify the network conclusion with respect to the input. For example, the neural network layers may break down input comprising an optical image of a music score into its constituent musical parts, so that the musical parts correspond to the input samples and the output values may specify decisions about the input, such as whether a given input sample was a whole note or half note, and the like. Thus, input samples are received, each sample is processed by the neural network (NN), and the NN produces a decision or conclusion about each sample. A trained NN incorporates data structures associated with labels assigned by the NN that correspond to the output values.

To use any NN in processing an input sample, it is first necessary to train the network so it can provide useful output upon receiving the input sample. Each item of training data must be comprised of an input sample and corresponding desired output values. Selecting an appropriate collection of training data and preparing the collection for input to the neural network can be a lengthy and tedious process. Carrying out the training process is important in order to provide a network that has the capability to produce an accurate OCR rendition of the captured music score image. A data set that is acceptable for training a neural network can be split into two distinct data sets: (1) a data set for training, (2) a data set for testing the quality of training achieved. The remainder of this document refers to a training data set with the understanding that a testing data set could be created using equivalent methods.

To generate training data for training a music OCR neural network, images of multiple music scores must be processed, and for each score image, a corresponding data description must be produced with correct data parameters according to the neural network configuration and the desired output. A single score image to be processed has potentially hundreds of notes and symbols that must be associated with the correct label or output value. Many scores must be processed to create a training data set. With a smaller set of training data, training will be more quickly concluded, though in general output accuracy and quality will be compromised. With a larger set of training data, the neural network will be better trained and should thus provide higher quality output, though preparing the training data will take more time and effort.

What is needed is a means of efficiently collecting and preparing data for use in training the neural network. The data collection technique must produce data sets that are based on music score images and that have correct data values (i.e., desired output) for the parameters that describe the music score images in terms of the neural network data structures, such that the parameters are converted during processing in accordance with the network data structures. This processing required may consist of image manipulation, artifact location mapping, and file format conversion.

To ensure high quality output, the collected data of the training data set must be of a high quality. That is, a high degree of consistency should exist between the labels and the image samples to which they are intended to correspond. Also, image characteristics should conform to desired criteria for which the system is intended to successfully process. Thus image characteristics should reflect "real world" artifacts that the system will deal with successfully, such as embodying typical optical distortion and being legible to a human.

Finally, the training data should be presented to the NN that conforms to specifications of the data set format and content and the NN configuration. In general, to successfully train a NN, a deliberate scheme is required for presenting data set elements, where the scheme may influence data element order, frequency, content manipulation, and the like.

SUMMARY

Embodiments of the invention provide for data set generation, and data set presentation, as well as the software applications and user-extensible software framework engendering and implementing this process. Operations for preparing the training data can be provided within a single software application or can be implemented in multiple independent software applications. An image is processed by determining a location for each of one or more musical artifacts in the image and identifying a corresponding label for each of the musical artifacts, generating a training file that associates the identified labels and determined locations of the musical artifacts with the image, and presenting the training file to a neural network for training. In this way, a training data set is produced that can be used to train a NN and provide consistently high quality output.

Embodiments of the invention generate and present training data to a NN training system, so as to produce a trained NN that can be used in a music OCR task. Accompanying objectives are ensuring a high quality of the training data, maintaining information obtained from the data collection process inviolable to modifications of processing modules, and maintaining flexibility within data representations and among the processing steps.

Other features and advantages of the present invention will be apparent to one of ordinary skill in the art upon review of the detailed description of the present invention and the included figures.

BRIEF DESCRIPTION OF DRAWINGS

FIG. 8 through FIG. 15 are screen shots that illustrate operations performed by the system described in accordance with FIG. 1 through FIG. 7.

DETAILED DESCRIPTION

Figure 1:
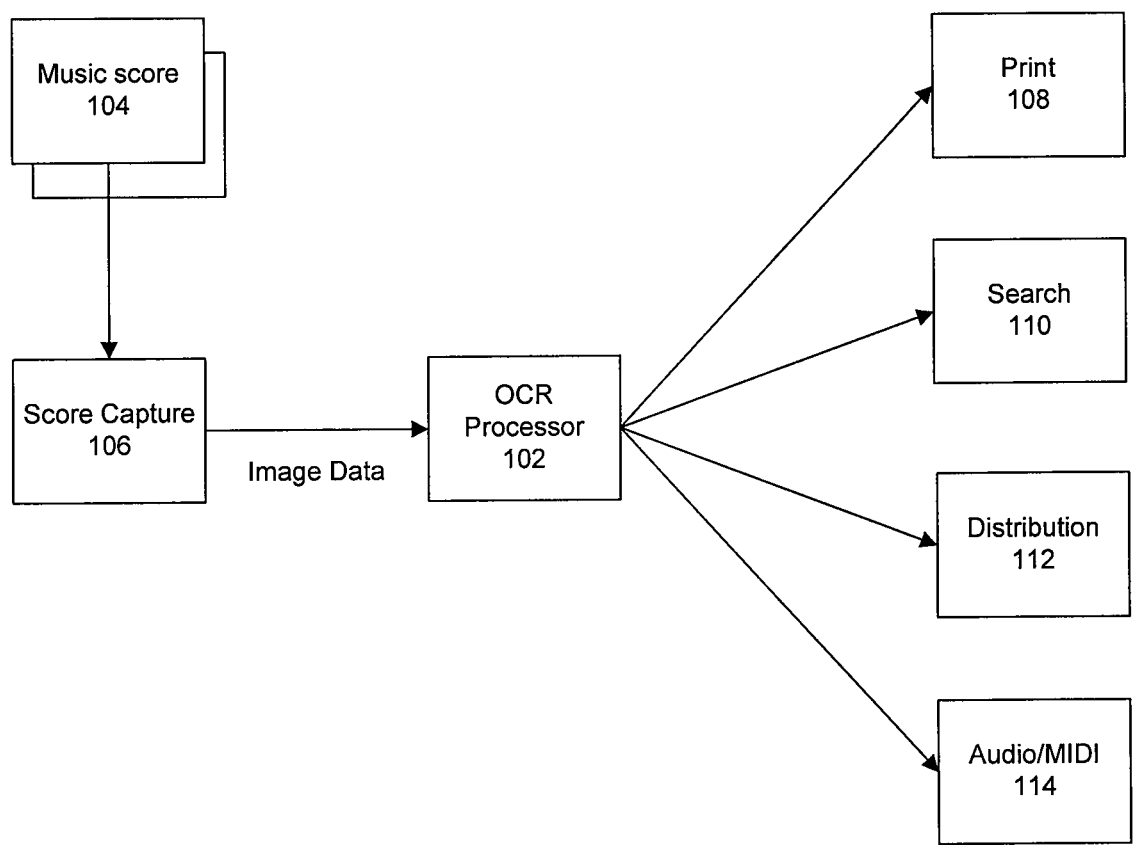
FIG. 1 is a block diagram of a system that provides music OCR in accordance with the present invention.

A digital image of a musical score is represented according to a set of labels that specifies characteristics such that every music artifact in the image is given a characteristic set of labels. The musical artifacts in the score images comprise notes, musical symbols, and the like. Labels designated to these artifacts indicate musical information such as pitch, duration, and the like. Additional hierarchical sets of data categories and possible data values for each artifact can be associated with the designated artifact. The set of labels that are associated with each of the music artifacts in a music score sample are used to train a neural network to draw conclusions about input samples using a neural network. OCR of a music score is provided by processing a captured image of a music score to identify music symbology in the captured image, process the identified symbology, and produce a digital output that corresponds to the captured image.

The data generation process consists of first forming representations of musical symbology in single score images, and subsequently congregating and transforming these representations to obtain a data set comprised of multiple score images and their representations. The single and multiple image processing phases include three common steps: generation, revision and transformation of a data representation, where the representation corresponds to a single image or multiple images, respectively.

Single score image representations are stored in data files called ".dat" files and may be generated in more than one manner. Those skilled in the art will understand that a .dat file refers to a file whose name includes the three-letter extension "dat" following the descriptive file name proper. The .dat file contains header information such as image filename and the label and location values for artifacts specified as existing in the image. Among the .dat file generation methods, a human operator may use a locate and label software application to manually specify labels for music artifacts in a score image, or alternatively a .dat file generation interface may communicate with a previously trained music OCR system to produce likely artifact locations and corresponding labels. The .dat files generated by these or any other unspecified method may then be edited in the locate and label software application to correct inconsistencies between an artifact and the previously designated location or label. After any desired editing is completed, in general a geometric transformation will be applied to the image and its corresponding .dat file. This transformation is applied in order that all images accessed by the multiple image processing phase will share a set of common features, features including at least scale and orientation. Typically this common space is the "Ultimate" image space, described further below.

The location of an artifact in a score image is specified in the corresponding .dat file in terms of pixel coordinates. If a geometric transformation were applied to the image, to maintain consistency of representation, the location information in the .dat file must receive a corresponding transformation. Thus, the location information representing a musical artifact can be said to exist in the space of its corresponding image. Three image spaces are important to the data generation process, namely an Original space, a Located space, and an Ultimate space, corresponding to the space of the image at time of creation (such as by optical capture), time of artifact locating (such as in the locate and label application), and time of final data set file creation, respectively. Depending on the method of .dat file generation and the transformations applied to images and corresponding .dat files throughout the entire data set creation process, one or more of these spaces may be the same.

The software framework underlying the data set creation process provides an interface to a version control system (such as a Sub-Version or Concurrent Version System) that maps .dat files and corresponding images according to a custom-specified transformation function and submits the resulting files to the version control repository. For example, if artifact location information were generated for an image that had been rotated relative to its Original space by a skew correction function, then specifying a transformation from Located space to Original space would map the Located .dat file data to Original space, where it would remain inviolate to future modification to the skew correction function.

The multiple image processing phase of data set creation acts on .dat files and corresponding images that exist in the Ultimate image space. An intermediate representation is generated for the subsequent revision step. In the revision step, a human operator uses a software application to identify label errors, by inspecting a tiling of image samples corresponding to artifacts with a common label designation. The label designation common to the tiling is specified from the application user interface. Location errors for a given tile may also be visually detected. A tile can be marked to indicate that the corresponding image sample should be corrected or deleted. Correction can be performed immediately or otherwise from within the user interface. As any given artifact has many label values describing it, this error spotting process should be iterative. After the revision step is completed, the intermediate multiple image representation is transformed into a mat file format and saved. In general this format could comprise one or more files, for example labels and image samples could be saved as two separate files; herein a mat file will refer to a data set containing both image and label information. The .mat format will differ from the intermediate format: label information may be combined and reorganized, and image samples may be sized differently. Finally, for preservation of information, .dat files can be exported with corrections made in the revision step, and the version control interface can be invoked to update the files in the specified image space.

For the music OCR training process to occur, the music OCR NN training process must access the generated data set stored in mat format. A data set presentation interface is initialized with this data set and interfaces with a NN training module, which in turn applies a training algorithm to the data elements and the NN. The presentation interface controls the frequency and order of presentation of data elements according to their label type, and can additionally manipulate the image sample content.

FIG. 1 shows a system that processes music image data in accordance with the present invention to provide an optical character recognition (OCR) feature. An OCR processor 102 receives image data of a music score 104 that is captured with a score capture device 106, such as a camera, scanner or score display software application in the case that the music score exists in a digital format such as MusicXML. Those skilled in the art will recognize that MusicXML is a music notation file format that provides a textual representation that can be used to generate a standard musical notation score. The OCR processor 102 produces music score output comprising data that corresponds to the music score input, albeit in a digital form that can be put to a variety of uses. The digital representation of the music score can be easily transferred to other applications or mediums, including but not limited to printed output, a search mechanism, distribution and collaboration among multiple users, and audio output such as with music instrument digital interface (MIDI) synthesizers. For example, FIG. 1 shows that the music score output can be provided to a print function 108, a search function 110, a distribution function 112, and for audio/MIDI output 114.

Music Score Capture

FIGS. 1-5 relate to processing of received image data, which will be referred to as captured image data. The captured music score images can be produced with a variety of image capture devices, including a Web cam (generally less than 1.0 megapixel (MP) to about 2.0 MP resolution), a mobile phone camera (typically less than 1 MP to about 2 MP), a point-and-shoot camera (generally 1-3 MP), as well as more sophisticated cameras (above 3 MP). Once the image of the music score is captured, it is presented to the OCR processor for adjustments and additional processing, as described further below.

In addition to digitizing an optically captured score image, a score captured image may include a digital score image generated from a digital music representation, such as MIDI or MusicXML. Commercial and free software applications exist for this purpose. Such applications can produce score images of high resolution and are suitable for generating captured image data for use by the system illustrated herein.

OCR Processing

Figure 2:
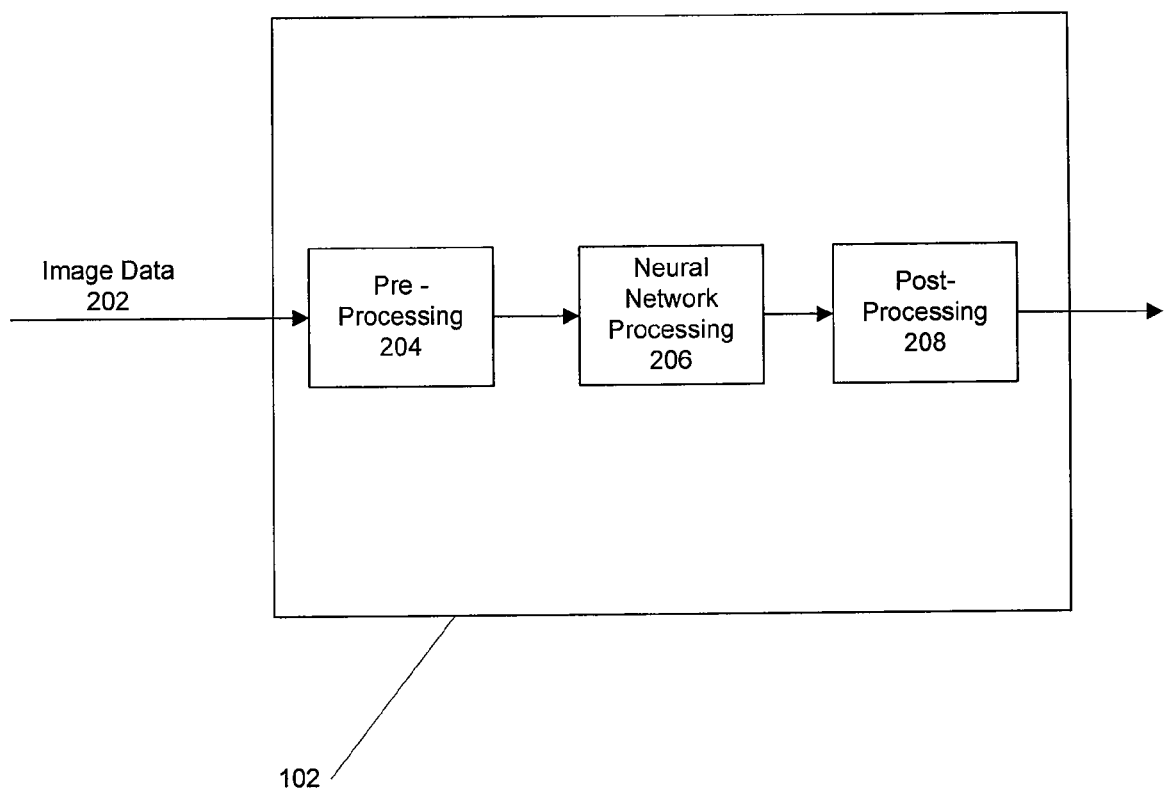
FIG. 2 is a is a block diagram of a processing system that provides the music OCR output of FIG. 1.

This section describes the operation of the OCR processor, utilizing a neural network to process the captured image data, such as illustrated in FIG. 2.

FIG. 2 shows the image data 202, produced from the capture device 106 (FIG. 1), provided as input to the OCR processor 102. FIG. 2 shows that the OCR processor 102 includes an image pre-processing component 204 that receives the image data. The image data may be in the form of, for example, a bitmap image (.bmp), JPEG data, TIFF data, and other file formats commonly used by digital cameras, and the like.

The image pre-processing component performs operations including binarization, skew-correction of the image, staff selection, and scale normalization. If desired, background component removal can optionally be performed to delete scanning artifacts such as smudges and the like. The binarization operation relates to adjustments for brightness and contrast in the captured image. The skew correction operation relates to correction of images that are rotated from an orientation that aligns music staff lines to be parallel to the bottom edge of the image. The staff selection identifies the staff region, ignoring material outside of its bounds. The scale normalization first estimates the current scale and then resizes the image such that its scale assumes a standard value. If desired, the preprocessing operations can be performed by external image processing routines or modules.

The cognitive processing involves identifying music symbology in the optical image. In this context, "music symbology" relates to visual representation of artifacts of musical notation, such as note-heads, stems, flags, clefs, staff lines, and the like.

The Neural Network (NN) processing component 206 comprises a trained neural network that receives the adjusted music score image from the pre-processing component 204. The NN processing component identifies music symbology in the captured image, and performs cognitive processing of the optical image. That is, the neural network performs a computer process that recognizes the music symbols in the captured music image, by determining appropriate output values and confidence values for the artifacts in the captured image.

The symbology recognized includes but is not limited to: clefs, accidentals (sharps, flats, natural signs), all types of note-heads, stems, flags, rests, multiple simultaneous notes (chords), rests, staccato markings, dynamic indications, phrasing markings, tempo and musical character markings, and additional musical notations as appropriate.

The post-processing component provides additional information about the identified symbology relating to music context than is present at the output of the NN. The symbology output from the NN only provides data that identifies artifacts in the captured image with symbolic types such as note-head, flag, stem, clef, and the like. The post-processing is responsible for integrating such information, for example, to attribute a triplet symbol to a collection of note-heads and flags, such that they are linked together as a group with appropriate duration.

The interpretation by the post-processing component 208 is based on the confidence values produced by the NN, in conjunction with spatial and grammatical constraints inherent in the music symbology. For example, these constraints disallow more notes in a measure than could spatially fit at the given spatial scale, and also disallow an accidental being applied to a rest. Those skilled in the art will be familiar with constrained interpretation techniques for NN confidence value output data. The post-processing then produces the OCR processor output in a suitable format, such as musical note information or other information corresponding to the identified musical artifacts. For example, the music information may take the form of an electronic instrument representation, such as the MIDI format, or other data format, or other combination of information, and serve various functions such as in print, search, distribution, and audio, as illustrated in FIG. 1.

Neural Network Training System Process

One fundamental task underlying music OCR is the classification of image data according to a known set of musical symbols. Such tasks are illustrated in the flowchart of FIG. 3.

A NN can be trained to perform this classification task by means of a supervised training, in which both inputs and desired outputs are known to the training process. During training, the NN is presented with an example input and produces an output; the training algorithm compares the NN output to the desired output and provides corrective feedback to the internal parameters of the NN, thus training the NN, teaching it to associate specific inputs with specific outputs. If the data set is well-crafted, it will consist of input examples representative of the complete set of inputs on which it must perform. Additionally, the data set must be highly consistent;

if inputs are incorrectly paired with outputs in the data set, the NN will be stymied from learning the intended correspondence.

Figure 3:
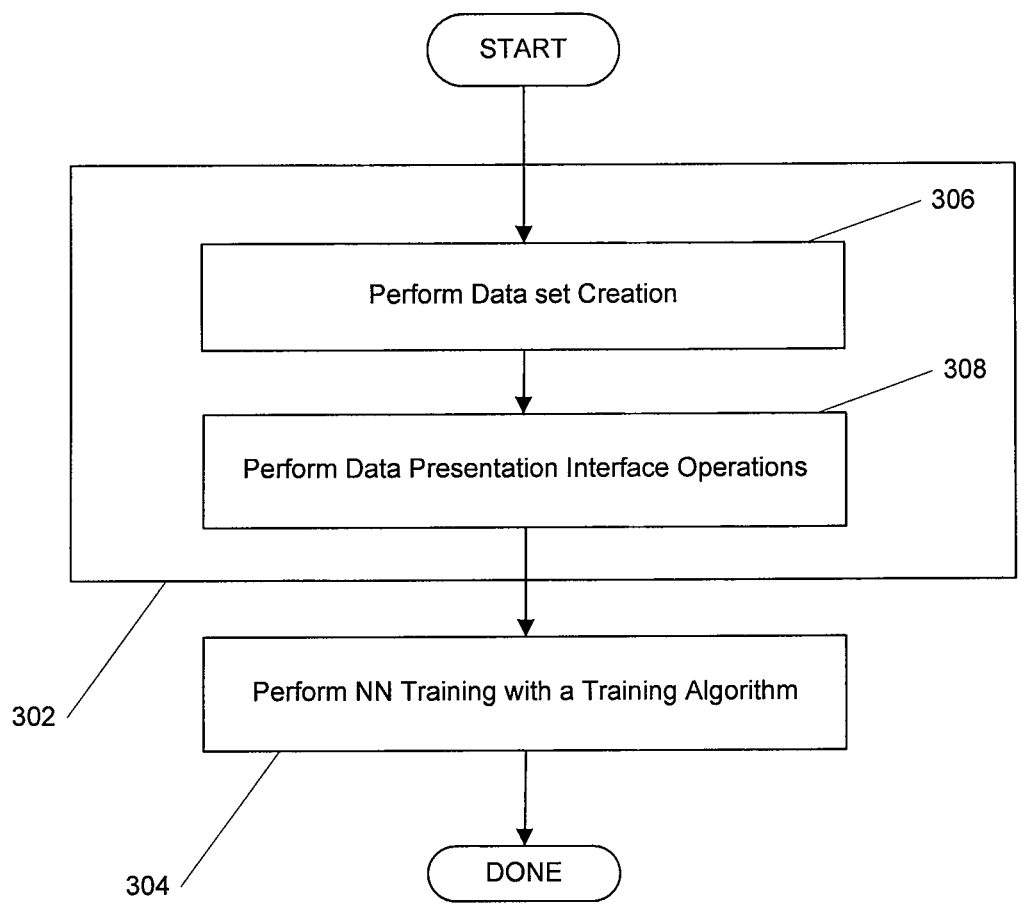
FIG. 3 is a flow diagram of a training system, resulting in a trained NN that can perform NN processing for the music OCR system illustrated in FIG. 2.

FIG. 3 shows operations of generating a training file (box 302) followed by training (box 304). The data set creation is of fundamental importance to the training process.

The description of a NN training technique above refers to the method for updating the NN internal parameters. For example, variations of the back propagation method are commonly used to train neural networks.

A component of the training process distinct from both the data set creation 306 and training technique 304 is the method of presenting data set elements to the NN, depicted as box 308 in FIG. 3. The data presentation method uses many parameters to deliberately select data elements from the data set for presentation. These parameters include: the presentation frequency per output category, presentation order, presentation frequency of multiple datasets, displacement of image region about artifact, additional distortions applied to image samples.

For example, noteheads are very common music artifacts. Noteheads appear in many different contexts and many different modifiers such as dots, ties, accents, and the like, and it is important that the OCR system receives accurate notehead information if it is to reproduce a score aurally. Hence, noteheads ought to be presented during training with greater than average frequency. Additionally, within the general category of noteheads, the presentation of half-noteheads and filled note-heads can be specified.

Refinements to the training data presentation may be provided. For example, the order of data elements can be randomized using a seed value for consistent results. Multiple data sets with different properties, such as font or camera type, may be utilized. Careful specification of input image region selection may be utilized. Additional image transformations may be applied to the image samples to model various optical distortions such as noise and blur.

Data Set Creation Process

This section describes the use of the data collection framework and software application designed to facilitate creating data sets that are suited to the NN and its music score processing operations. A "data set" herein refers to a literal set of data elements, where each element is comprised of an image sample and a label representing the musical content of the image sample. As depicted in FIG. 3, after being created, a data set is subsequently presented to a NN training algorithm by means of a NN data presentation interface. Thus, a data set can be considered to be a final result of the process of a data collection, such that data elements are considered appropriately labeled and transformed, yet will still be subjected to operations in the data presentation module before serving to train the NN.

Figure 4:
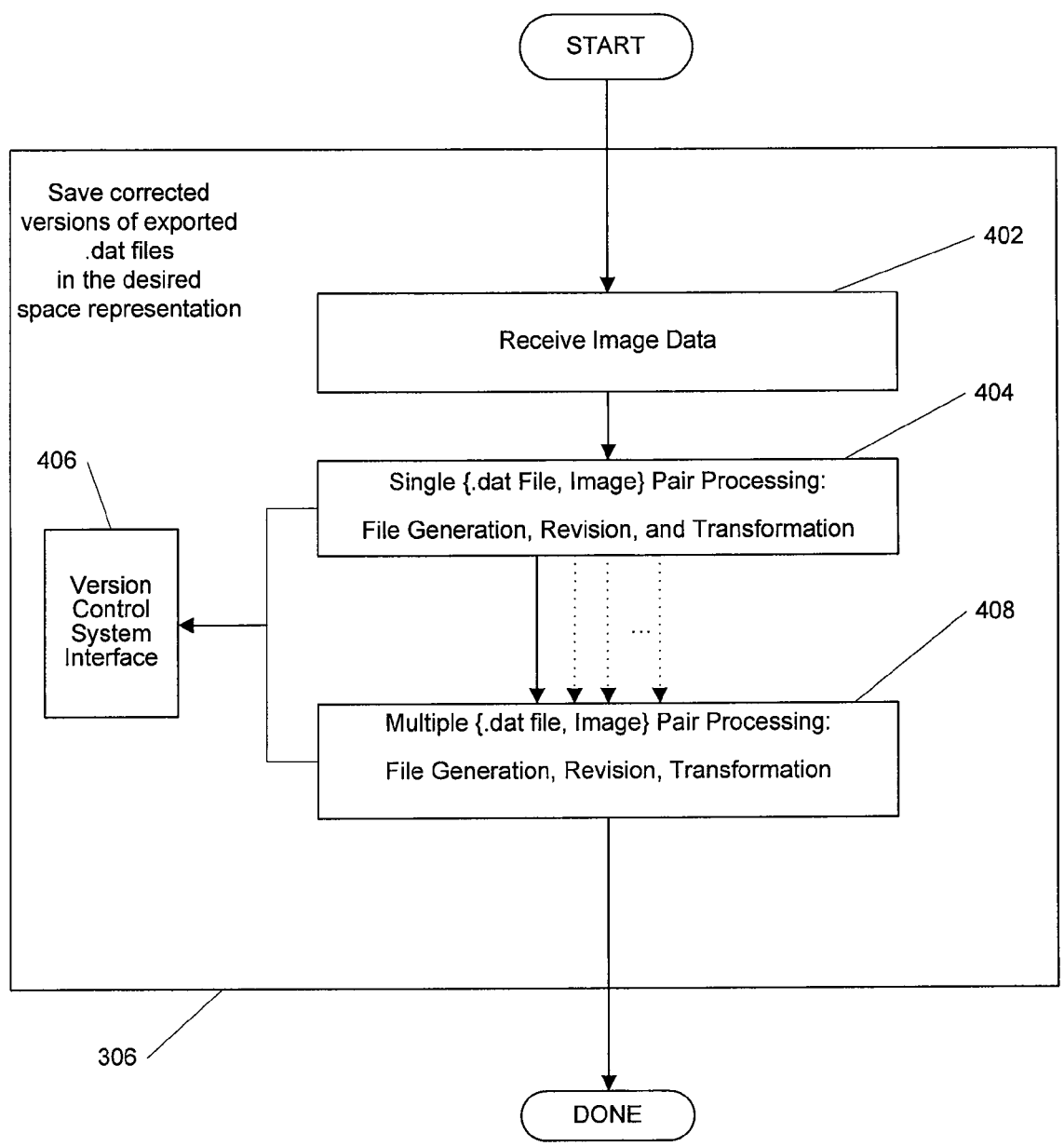
FIG. 4 is a flow diagram of the process of creating a data set that is to be used in the NN training process illustrated in FIG. 3.

The data set creation process, depicted as box 306 of FIG. 3, is next described in greater detail in conjunction with FIG. 4. The process involves operations to generate a representation of symbology in single music score images, and operations to manipulate and combine a large number of images and their representations so as to form a data set. Thus data set generation operations apply to a single image and its artifact representation data, as shown in 404, or to multiple images and their corresponding representations, as shown in 408. The multiple arrows from box 404 to box 408 indicate processing of multiple images.

Component 402 shows the data set creation process beginning with the receipt of image data. As described above, the image data may be optical or purely digital in origin. However, for training data to be well-matched to specific music OCR task, the images should be consistent with the image type to be used in practice. That is, if the application aims to work on optically captured images, then in general this type of image should be used to create the training data set. Further, if the training data set is comprised of optically captured images, they should include a variety of lighting conditions, focus settings, and the like. This ensures that the trained network will be ready to process (and make sense of) images of varying quality. Thus, the limits of the data image clarity with respect to lighting, focus, and so forth should approach the limits of the lighting and focus capabilities of the cameras with which the trained network will be used in field operation by end users. That is, the training images should not be only for images captured under ideal conditions, but should include fuzzy, less distinct, and dark images. For example, the training images could include images that were captured using an optical camera with reduced resolution.

Additionally, in general, all image manipulations performed by the OCR system should also be used to create the training data set. For example, if one binarization algorithm is used to create the training (and testing) data set and a different binarization algorithm is used in the NN pre-process operation, the NN performance in practice can be expected deviate from its performance with the testing data set.

As depicted in FIG. 4, a version control system interface 406 is accessed by both the single and multiple image processing operations described above to save corrected versions of exported .dat files in the desired space representation. This interface serves to protect the image data representations, inviolate to changes in software transformation functions and changes in data formats. In practice, OCR systems evolve functionally both during initial development and during subsequent stages of improvement. This functional evolution can affect how images are transformed both in terms of geometrical and simple value-based pixel transformations. For example, improvements may be made to an algorithm for scale or skew estimation, such that in general a different estimate is generated, and a different corrective transformation is applied to the image. To minimize the effects of such changes to data previously collected, all data representations should be transformed to an image space prior to undergoing geometric transformations, and the image from this prior image space should be retained in this prior space in its state prior to any pixel value transformations. Taking this approach, any new developed transformation functions can be applied to the image and its artifact representation data (i.e. .dat file) from this prior image space for the purpose of data set creation.

The version control system interface also facilitates decentralized data collection. In practice the data set generation process occurs in an organized fashion in which all images and representations are stored in a central location; the captured images input to the data generation process might also be collected in an organized fashion. However, the human data collectors engaged in the data set creation process may be stationed remotely. The interface 406 allows these users to transparently access images and existing image artifact data representations in the desired image space without having to explicitly access a transformation application, and without having to keep track of any previous transformations applied an image and its artifact data.

This functionality operates such that the desired transformations first are specified by an administrator to the computer system where the repository accessed by the interface is present. After this specification, users may use the interface to request a specific image from the version system repository in the desired image space. If a mapping from one image space to another has not been specified by an administrator, then a request for such an image representation will be unavailable to a user. Note that the specification can be provided in the form of a software function in a form that can be called by the version control system interface.

As a feature, images may be assigned an image space designation, such that a request by an operator for an invalid transformation type would be determined invalid. For example, using this feature, an image designated as only belonging to the Located image space would be unable to perform a transformation on the given image that maps from Original to Ultimate space. However, if the image were designated Original image space, or both Original and Located image space (meaning that the spaces are the same), then this transformation would be permitted.

As an example of typical usage, consider a data collection operator who is responsible for revising (correcting any location or label errors) the artifact data for a given image. Further consider the case for which the image had been previously located and labeled in the Located image space, and that the transformation used to map to that Located space has since changed. That is, using the image transformation functions on the original image would now create a different image than was used for the locating and labeling. If the operator wants to perform revision operations in the Located image space (such as the case where image size, scale, or other distortions make this preferable) the operator would request to check-out the original image mapped under a transformation in the Located image space. Note that the original image was assumed to exist in the repository, and the previous located representation was assumed to have been mapped back to Original image space previously.

As another example, consider a data collection operator who wants to generate a new data set from a set of .dat files that have been collected over a long period of time, during many changes to software implementing image processing and transformation functions, and so forth. Assuming all original images are available, and all data representations were mapped back to this space, the operator can simply check-out the entire collection (e.g., a directory) of .dat files and images in the Ultimate image space using the version control interface. The data set can be generated using the format transformer of component 718 in FIG. 7.

In practice, non-invertible functions (such as generalized pixel mapping with interpolation) and final quantization effects (due to the fact that final pixels locations are integers) are found to be non-problematic to this method.

A conventional version control system such as Subversion or Concurrent Versions System provides tools including the ability to efficiently store files and their modifications, as well as the ability to access all previous file versions the original file or any of its modifications. These typical functions of version control also benefit the data collection process. Specifically, accidental corruption or deletion of data may be undone or the consequences mitigated by accessing a copy of the data previously committed to the repository. To all permit flexibility of use and conceptual integration in the data generation process, the version system interface implements two forms of identify operations: (1) a an identity transformation (that is, no transformation is applied) and then commits a file using the version control system, (2) a by-pass to the version control system such that the file based input is also file based output.

Single Image and Data Representation Processing

Operations described below involve processing a single image in order to generate representations of artifact location and labels, to revise these representations and finally to transform both the image and its artifact data in a standard way. After these operations are completed, the image and its artifact data will be in a state ready for combination with other like data for the purpose of data set generation.

Figure 5:
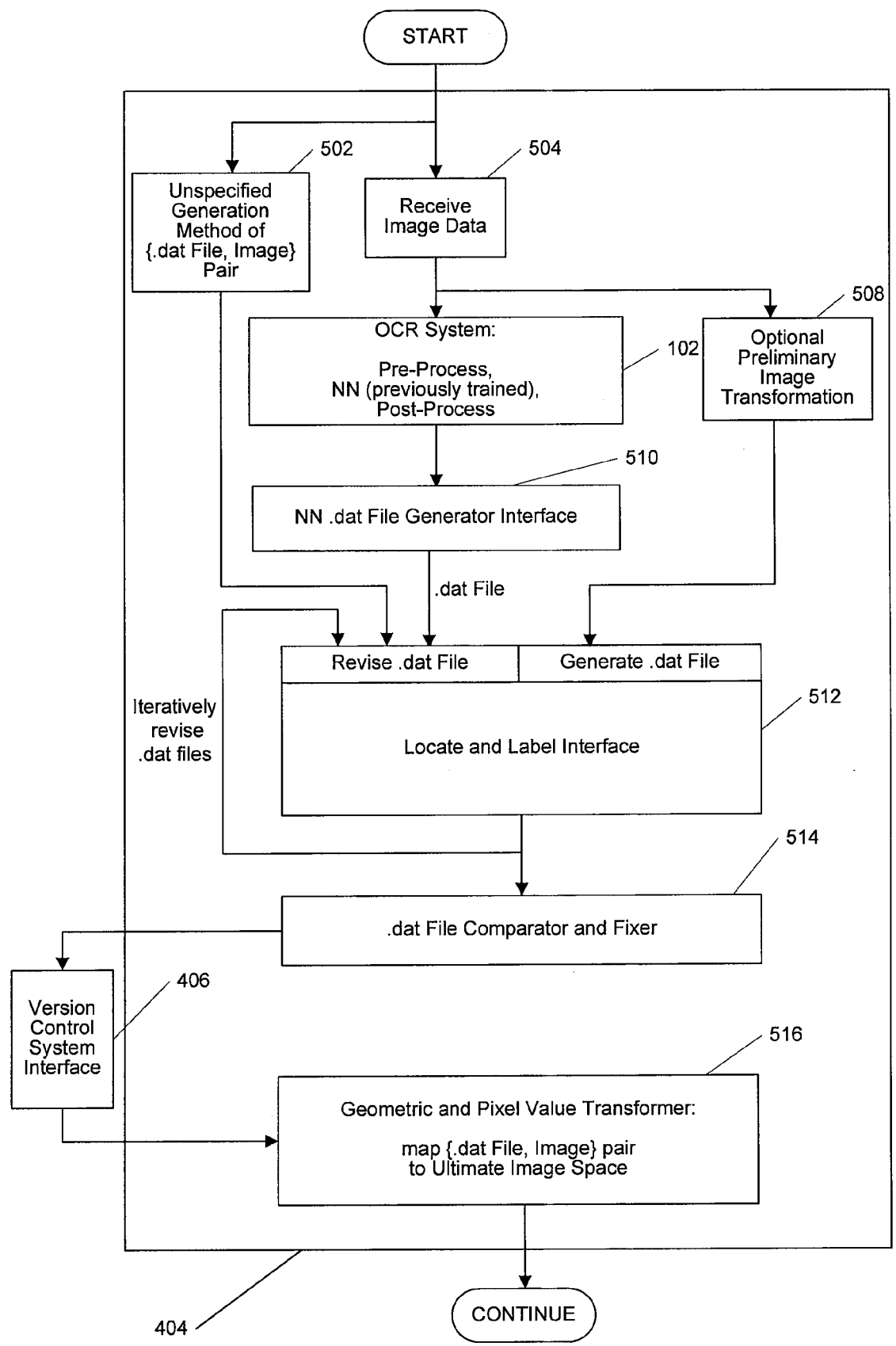
FIG. 5 is a flow diagram of the process of generating, revising and transforming the representation and image data of a single digital image, resulting in output of a .dat file and image pair.

FIG. 5 describes in greater detail the processing of the single .dat file and image pair processing depicted as box 404 in FIG. 4. Typically at the beginning of processing, image data is received from a score capture process as described by component 106. Afterwards, the image is eventually processed by either a human operator or the cognitive function of the NN in an existing music OCR system. However, as shown in 502, an unspecified means might exist of generating an image simultaneously with its artifact location and label data, stored in a .dat file. As illustrated in FIG. 5, all three scenarios lead the processing flow to the locate and label application specified in 512. This interface, discussed at length below, is a fundamental tool in the data set generation process that provides an opportunity to revise as well as generate new image artifact data representations, stored in .dat files.

Note that the Original image space of the image generated by unspecified means will be the same as its Located image space, since the .dat file is assumed to have been created simultaneously and to correspond to image. The image should be submitted to the version control system interface for data representation protection, as described above. Similarly, the received image data, or original image data, in 504 also should be submitted to the version control system interface. Later a .dat representation from a different space may be mapped back to the Original space to correspond to this original image.

FIG. 5 depicts processing of the OCR system 102 (FIG. 1) with processing flow as shown in FIG. 2. As described above, the system accepts a score image, performs initial image manipulation in the pre-process operation, and then deconstructs the resulting image into music symbology in the NN processing. As NN output corresponds to its corresponding input, an image location in the input image can be known for each NN output. Additionally, as described above, the NN classification output can be interpreted by the post-process operation to provide a representation of the symbology contained in the input image. Hence, both location and label information can be derived for the input image by interpreting data available at the NN post-process step. The component 510 shows an interface to the OCR System that accesses the post-process data symbology and corresponding location information, and re-expresses it as a .dat file.

The component 510 can be said to "boot-strap" an existing functional OCR System, by using it to collect training data for the purpose of improving the OCR System. Benefits of using this bootstrapping operation are twofold: (1) it speeds-up the data collection process, since most of the location and label information produced by the system will be correct, (2) it allows weaknesses of the system to be targeted specifically-- that is, additional data can be collected to specifically target the image artifact types that confused the system in previous rounds, and can be presented to the OCR System NN subsequently.

Although the processing method of the component 510 is a powerful data generation tool, it can only be used if an existing functional music OCR System with a previously trained NN exists. In the absence of such a system, training data must be collected by human operators using the locate and label application 512. As shown in FIG. 5, the locate and label application generates a new .dat file upon input of a score image. Depending on the image quality received from component 504, a preliminary image processing step shown in 508 may be useful to aid the human operator in the locate and label operations. For example, if images received in 504 have sufficiently skewed-orientation, extreme scale or more severe geometrical distortions, the optional preliminary image transformation in 508 may be important to facilitate the locate and label operations. Similarly, a binarization might be desired in 508 to facilitate labeling a dark image.

Locate and Label Application

The locate and label application provides a convenient GUI through which a user can locate and label every musical artifact in an optically captured image of a music score to produce a set of input and output data for training a neural network in performing music OCR. The musical artifacts in the music score images comprise structural elements of notes, musical symbols, and the like. The user associates each image artifact with an image location and with appropriate data values to indicate musical information such as pitch, duration, and the like. The training data is created from the captured image and associated musical artifact locations and labels.

The user interface permits a user to designate each musical artifact in the captured image and associate the designated artifact with an image location and a data value that indicates the basic artifact type. Additional data values from hierarchical sets of sub-categories can be associated with the designated artifact. It should be noted that the data collection software can utilize labels for artifacts according to categories that are different from and not recognized by the label categories utilized by the neural network.

The human operator can designate an artifact in the image and use a display cursor to select an artifact and have its location in the image automatically determined (e.g., pixel location within the image). Additionally, the location can be adjusted finely using arrow (cursor) keys. The label operation results in creation of a .dat file for the received image that stores artifact locations and associated labels.

Figure 8:
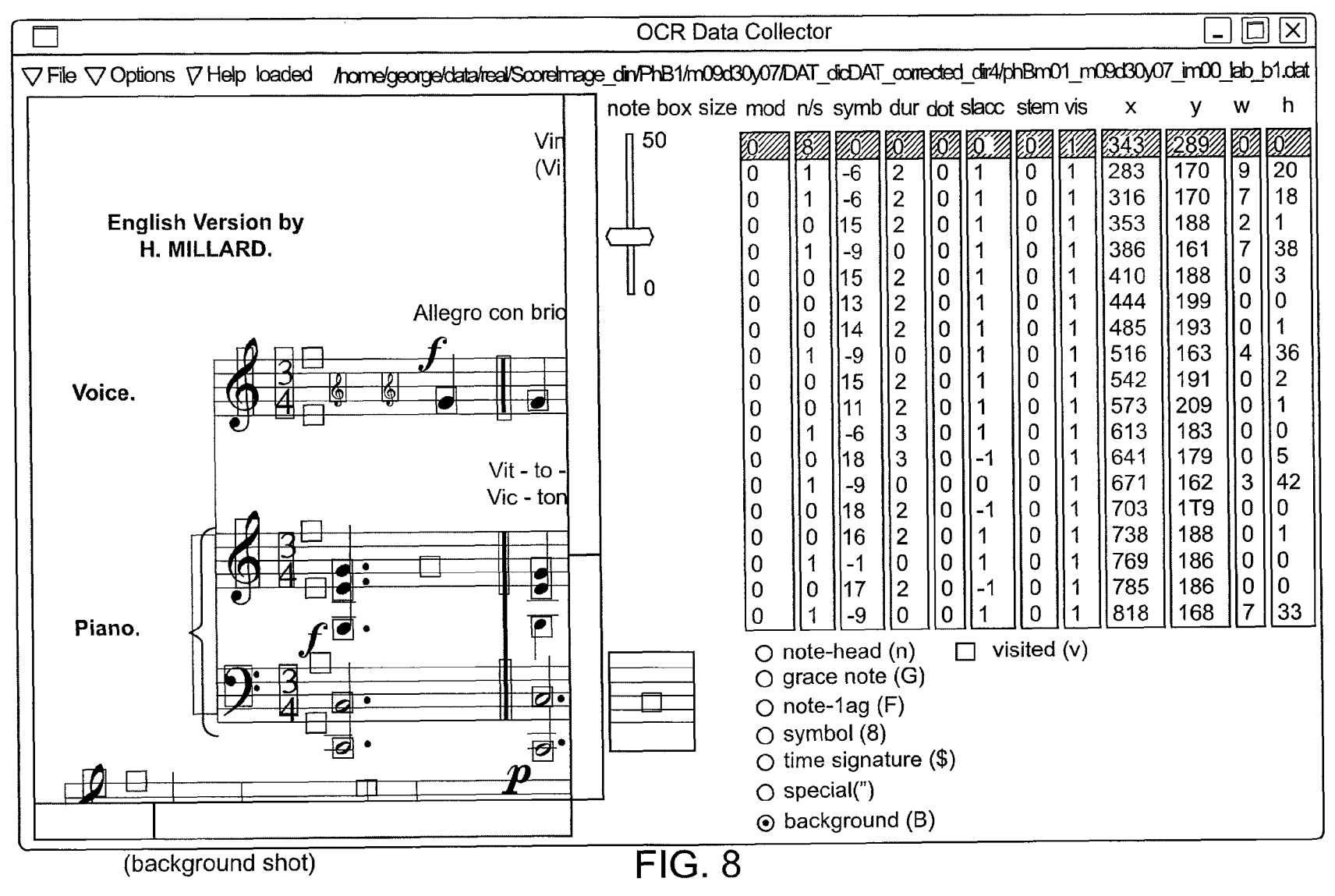

Positions of identified artifacts in the image are indicated by small colored squares drawn on top of the located artifacts in the image. This is illustrated in FIG. 8, which shows a screen shot of the display provided by the training software. The viewing window over a portion of the captured image is illustrated on the left-hand side of the window. Within the viewing window, the image of the captured score can be observed, with visual frames automatically around various image artifacts.

The general musical categories, or basic artifact type, that can be specified in the locate and label application include: note-head, grace-note-head, note-flag, accidental, symbol (including clefs, rests, triplet symbol, tie symbol, and bars), time signature, special and background. These categories relate to the types of information used by the neural network in its operation and include the following types of information.

General Musical Categories:
note-head;
note-flag;
grace-note;
symbol;
time signature;
background (for artifacts that are not musical and that the neural network should learn to ignore).
Notehead (and Grace-Note) Categories:
duration;
stem: up, down, up and down, or no stem;
dot type: single, double, or none;
staccato type: no staccato, has staccato, tied-left, tied-right, tied-left and tied-right.
Note Flag Categories:
duration;
stem: up, down.
Accidental Categories:
flat, double-flat, sharp-double-sharp, natural;
Symbol Categories:
treble-clef, bass-clef;
rests: duration specification can include dots;
bar lines: standard, double, begin, end, begin repeat, end repeat, begin and end repeat;
triplet symbol;
tie symbol.
Time Signature Categories:
cut-time and common-time symbols, and all time signatures composed of digits 0-9 (that is, digits are treated as separate symbols).
Special
designates artifacts that should eventually receive a label, but for which an appropriate label category does not yet exist.
Background
for artifacts that are not musical and that the neural network should learn to ignore.

Within the locate and label GUI window, a large viewing window (upper left of the screenshot) shows a portion of the captured image. Sliders (scroll bars) along the vertical and lateral edges of the viewing window control movement of the image within the viewing window. That is, the sliders move the viewing window over the area of the captured image. Pressing "Enter" centers the window over the image at the location of the active rectangle. A slider allows adjustment of a default box that appears around a single artifact when the artifact is clicked. With this slider, a user can single-click on a note-head, have a display box appear around the clicked note-head, and then drag the note-box-size slider with the display cursor to adjust the size of the box so that it just surrounds the note-head in the image. This permits a user to easily work with captured images of different scales, and to view located artifacts with a bounding box of varying size.

When an image of a music score is first opened in the window of the locate and label application, the user clicks on a single note-head approximately in the center of the note-head, and the default note box described above appears around the note-head. The center of the note box corresponds to an (x, y) pixel location of the note-head on the captured image. The image location data in terms of the (x, y) pixel location is automatically determined by the locate and label application and entered into a data representation associated with the score image. That is, the locate and label application automatically generates a data file associated with the score image being processed by the user. The data representation generated by the locate and label application is illustrated in the data table at the right side of the screen shot. Header information for the data file may be added for administrative purposes via a menu, such as for adding additional comments, or automatically using the computer system information, such as to identify the human operator who performed the labeling, the date of the operation, and the like.

A human operator can quickly process artifacts, by clicking on each artifact in the viewing window and filling in the other data values in the data representation table for the associated artifact. Clicking on a musical artifact in the viewing window highlights the artifact, such as with a colored box around the musical artifact, indicating the active processing area. Once the data values for an active artifact are filled in, the locate and label operation for that artifact in the image is completed and the user can click on the next artifact in the captured image. Each set of data values for each processed artifact comprises a row of data in the table at the right. The set of all labels for all artifacts in a music score image (i.e., the contents of the graphical data table) comprises the training data labels for the associated image, and is written to the .dat corresponding to the music score image.

In the screenshots of FIGS. 8-15, the value in the first column of the data representation table ("mod") indicates whether the corresponding musical artifact has been marked for revision or deletion in the error-spotting operation. Artifacts can also be marked for deletion using the Options menu. This may be appropriate in the labeling stage; if the locating and labeling steps are kept conceptually distinct, then deleting a rectangle (e.g. with the Backspace key, or from the Options menu) is inappropriate. The second column ("n/s") indicates if an artifact is a note-head, a symbol or belongs to several other basic categories, e.g. grace-note, time signature, special, background, etc. Depending on the value (0=note-head, 1=symbol), the set of radio buttons below the table will be changed correspondingly. The third column ("symb") provides choices for type of symbol or the staff line position of a note, as the case may be. Similarly, the other columns of radio buttons beneath the table in the screen shot will change depending on data values and selections of the preceding table columns. The "dur" column specifies note duration; the "dot" column indicates a dot associated with the symbol as present or absent, single or double; the "stem" column relates to note stem features (e.g., present or absent, up or down); "stacc" relates to staccato (absent or to be applied), as well as other similar attributes such as a tie to left or right or absent; "vis" indicates whether the user has already processed the artifact. The columns x, y, w, and h are for (x, y) pixel position in the image for the center of the artifact and for height and width of a text box around a symbol. An artbitrarily large rectangle, rather than a default note box, can be entered if the user simply drags a corner of the box and positions the box using conventional graphical windowing techniques.

A copy of the image region surrounding the active rectangle is displayed in an active artifact window at the lower left of the table, and an iconic image of the selected artifact appears in an icon image window adjacent to the active artifact window. The iconic image is selected according to the data representation table entries and radio button selections for the active artifact. The two windows give the user an opportunity to compare the selected active artifact from the image and the corresponding icon image, so that corrections or changes in selection can be made.

Single Image Revision

After a human operator has performed locate and label operations on an image using component 512, the operator may subsequently perform revision on the same file from within the same interface.

Alternatively, if desired, the artifact labeling operation of component 512 can involve a second or additional human operator to mark symbols with labels. Using two or more human operators to assign labels provides a redundancy check. With two human operators, two copies of a .dat file are saved, with the labels input by the respective operators.

If multiple human operators are used to label artifacts in the captured images, then the .dat files produced by each operator must be compared for any discrepancy. Such operation is indicated by component 514 of FIG. 5. Any discrepancies can be indicated by a fix file that is produced from the comparison operation. The fix file has the same construction as a .dat file, but is given the "fix" extension for convenience and clarity. The operation of producing the fix file is included within box 514.

To resolve the discrepancies, a variety of techniques can be used to produce a final .dat file. For example, a third operator can make an independent decision on resolution of discrepancies, or the first and second operators can mutually agree on resolution. In practice, the number of discrepancies between multiple operators is likely to be very small. The result of the resolution operation is a modified .dat file.

Data Versioning

After the .dat file generation revision steps are complete, the file may be submitted to the version control system interface displayed in component 406 of FIG. 5. The interface will act to protect the representation stored in the .dat file, by mapping its data from the Located image space to the Original image space, where the original image was also stored.

Next the image and its artifact data representation, stored in a .dat file, must be prepared for operations performed on multiple images and their respective .dat files. Specifically, all images and .dat files will be transformed so as to be in a common image space, the Ultimate image space, in which the data set will eventually be created. Component 516 depicts this transformation; in general the image will receive a geometric and pixel value transformation, and the .dat file will receive a geometric transformation.

The specific transformation used depends on the image space from which the mapping is done. For example, if the version control repository interface were used to map the .dat file back to Original image space (in the process flow from 614 to 406 of FIG. 5), then transformations equivalent to the the pre-processing steps of the OCR System would be used, given the practice of using identical transformations in data set creation as are used in the "real world" OCR System. This can be understood as follows, the pre-processing operation (shown in 102) takes as input the original score image and outputs an image that is presented to the NN all inputs to the NN are always in the Ultimate image space.

Multiple Image and Data Representation Processing

Figure 6:
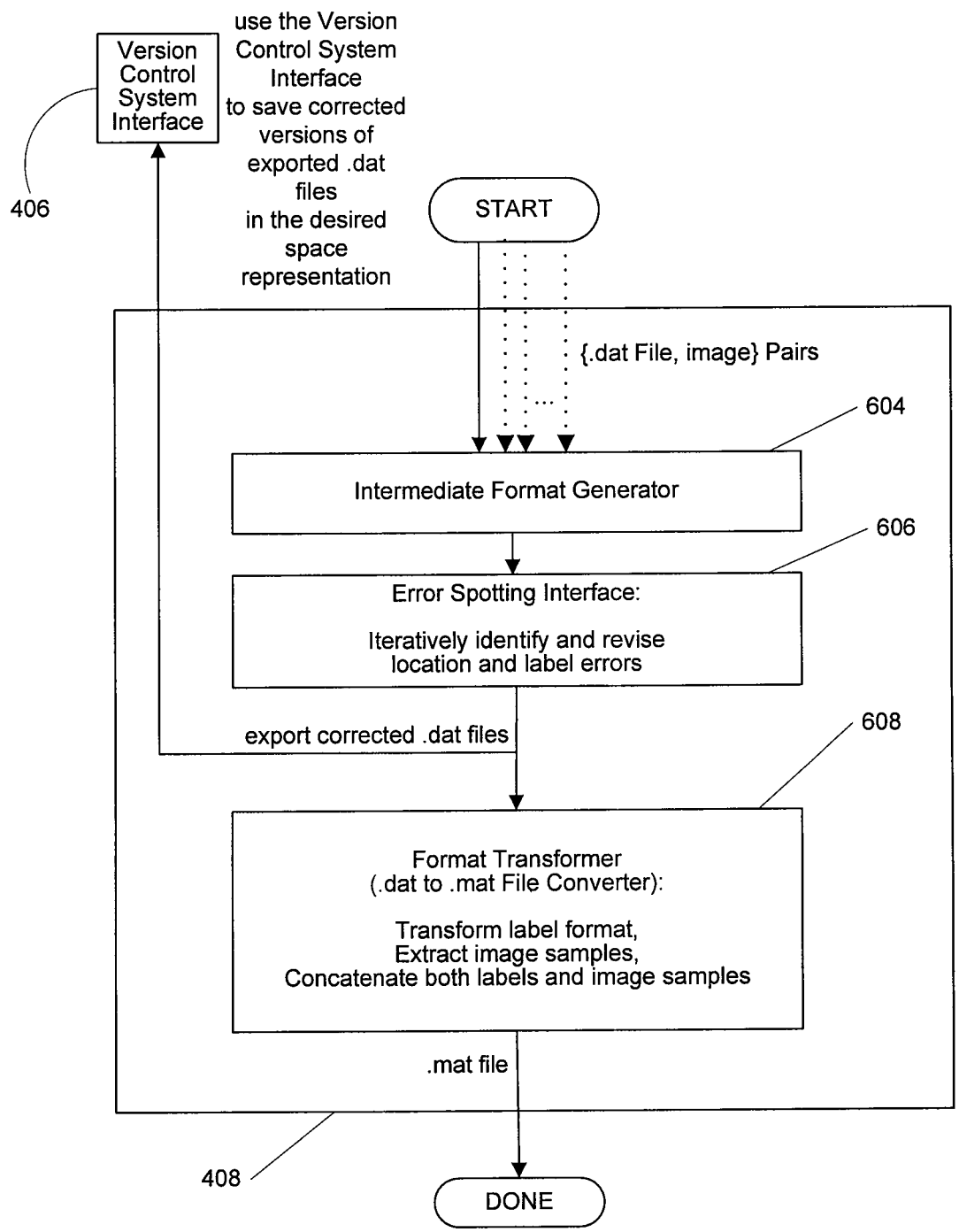
FIG. 6 is a flow diagram of the process of generating, revising and transforming representations of multiple .dat file and image pairs, resulting in output of a training data set stored in a mat file.

FIG. 6 describes in greater detail the multiple .dat file and image pair processing depicted as box 408 in FIG. 4. After the single image and data representation processing has been accomplished for multiple images, they can be combined and inspected for label errors and more subtle image characteristics.

As shown in component 604, the images and .dat files are combined into an intermediate file format that in general is only used by the error-spotting interface. The format is generated from a set of directories containing .dat files, where the directories are specified from within the error-spotting interface; alternatively an external program may be used. The format can be described as equivalent to a structure containing a matrix comprised of the artifact label entries from each specified .dat file, and a list that references the .dat filename corresponding to each artifact in the specified .dat files.

A revision operation may be performed at box 606 after the intermediate file is created.

The "error-spotting" or "outlier" operation provides an opportunity to check the correctness of the data values entered in the data representation table for a particular captured image and to make revisions as necessary. An "outlier" is a artifact image that is visually displayed amongst other artifacts with a shared label data value, but which visually appears distinct, indicating an incorrect labeling or more general artifact designation error.

It is usually easier to spot a data outlier when comparing like image artifacts against like entries. Therefore, the outlier operation gathers all like artifacts in a training set, such as all artifacts labeled as whole notes or all artifacts labeled as rests, quarter rests, and the like, and presents them in a display so that the user can quickly identify incongruous or inconsistent images. This helps the user to confirm that all artifacts labeled, for example, as whole notes do actually look like a prototypical whole note. That is, an artifact that was labeled as a whole note, but whose image looks different from every other artifact labeled as a whole note, should be relabeled, because it likely was not actually a whole note. In this way, it should be easier for a user to identify, for example, quarter note-heads that were incorrectly labeled as whole notes, and so forth. Modifier attributes such as duration type, dot type, stem type, etc. can also be specified and inspected.

The outlier operation also can gather all artifacts that were designated in the "mod" column of the data representation table for further review. This lets a user move quickly through the captured image by assigning labels to readily identified artifacts, leaving the more complicated or difficult artifacts for a later, more studied review.

Figure 15:
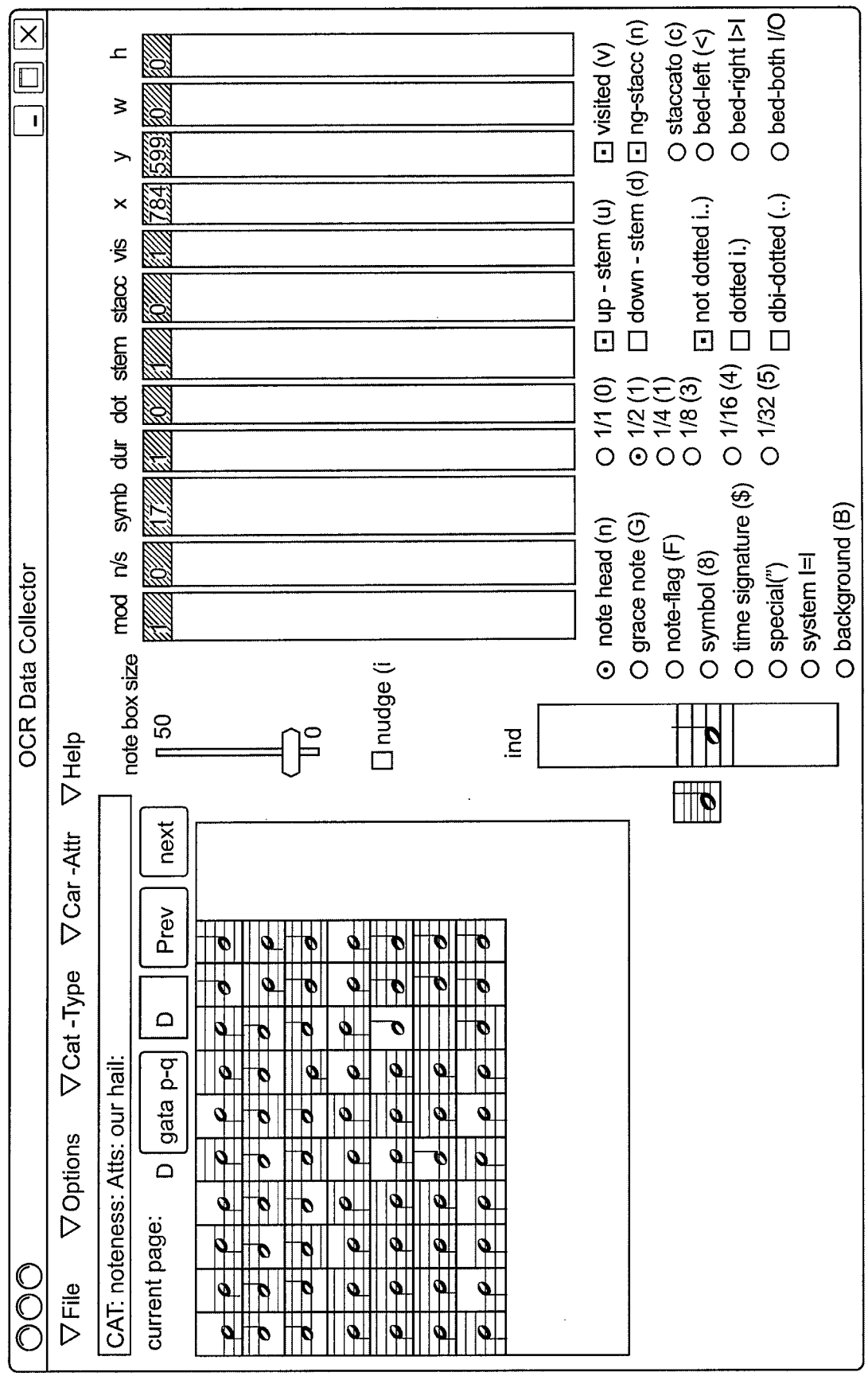

FIG. 15 illustrates the outlier operation, in which an artifact has been designated for modification and is shown in FIG. 15 in a highlighted manner. The human operator can then review the image for adjustment of the associated values (indicated in the twelve columns to the right of the viewing window). FIG. 15 also shows that the outlier processing window of the training software can provide a "nudge" feature to adjust the location of the label box around an artifact in the captured image. During the location phase of image processing, a human operator can use the nudge feature to move the note box for better coverage around the artifact of interest. For example, if the note box is off-center from an artifact, then "nudge" can be selected and then the note box can be moved using display cursor control so as to align the note box for symmetric coverage around the artifact. This improves the location information associated with the artifact and thereby improves the data associated with the artifact being located and labeled.

The outlier detection operation identifies outlier artifacts, and records that information in a file (an intermediate format file and/or a .dat file). A user may make label revisions immediately if desired, or at a suitable later time. All data is inspected by the user, with the user then entering an appropriate value in the "mod" column to indicate whether or not an artifact should be revised, deleted, or entering nothing if it should be left unchanged. This inspection process can be performed iteratively.

To perform the error-spotting operation on a collection of multiple images and .dat files, intermediate, a human operator specifies .dat directories for conversion, or choose an existing intermediate file for loading. After the human operator has examined the data to satisfaction, new .dat files can be exported with any updated label information.

Returning to the .dat file format is important for preserving the generality of the data; for example if the network configuration were altered and the input data set needed to be regenerated with different sizes, etc., this would be achieved using .dat files. Additionally, as shown in FIG. 6, the .dat files should be submitted to the version control system interface so that the corrections are mapped back to the other image spaces in order to preserve data integrity as previously discussed.

The NN data structure into which the label data is converted may comprise, for example, matrix column headings that characterize the artifacts in each score image area. Typical headings may include symbol type, dot type, stem type, and line type, where: "symbol type" comprises data values that indicate a whole note symbol, a half note symbol, clef, and the like; "dot type" comprises absence of a dot, or a single dot, or double dot; "stem type" comprises an indicator as to whether the associated artifact is a stem that extends upwardly, downwardly, or both; and "line type" comprises an indicator as to whether an associated note head is on a staff line or off a staff line. Other matrix column headings may be used, such as "staccato" to provide note modifier information such as the presence of staccatos and ties. Alternative matrix column headings may be used for the network data structure, such as the categories of symbology or notation that will be identified from the captured image, as described above.

In the next operation of FIG. 6, depicted in component 608, the training data set is created. This operation involves reading .dat files, parsing the location information for artifacts, then using this information to identify a region around the artifact in the image. In one implementation, a collection of .dat files is processed, with image and label data being stored in large separate matrices. Each score image is divided into smaller regions, these regions are mapped or designated according to a matrix and the mapping is saved to an input matrix data file. The label data is converted to a format suiting the NN classifier module data structure, putting it in a matrix whose entries correspond to those in the input data matrix, and saving it to data store as a label matrix file. That is, the collection of .dat files and corresponding music score images will have a single input matrix data file comprising a matrix having cells that correspond to respective pixel regions of the music score images, and a single label matrix file such that the matrix contain label values for the artifacts within each image region (matrix cell) of the corresponding collective input matrix file. Multiple such mat files can be concatenated using 608, resulting in a large mat file.

In addition to providing an effective and efficient means of detecting errors and correcting, the error-spotting interface can facilitate generalized inspection of image characteristics. In practice this inspection is particularly important for observing trends in image contexts and image distortions for particular artifact types.

For example, consider the case that a majority of sharp symbols examples preceded a whole note, it's possible that the NN would have difficulty generalizing to other contexts in which the sharp symbol appeared. With gained insight from the data inspection, these subtle problems can addressed.

As another example, suppose that most of the collected examples that a tie symbol have very low image contrast such that the tie symbol is nearly illegible. Without inspecting the data this relationship would not be determined.

Implementation of Training Data Set Creation and Presentation

Figure 7:
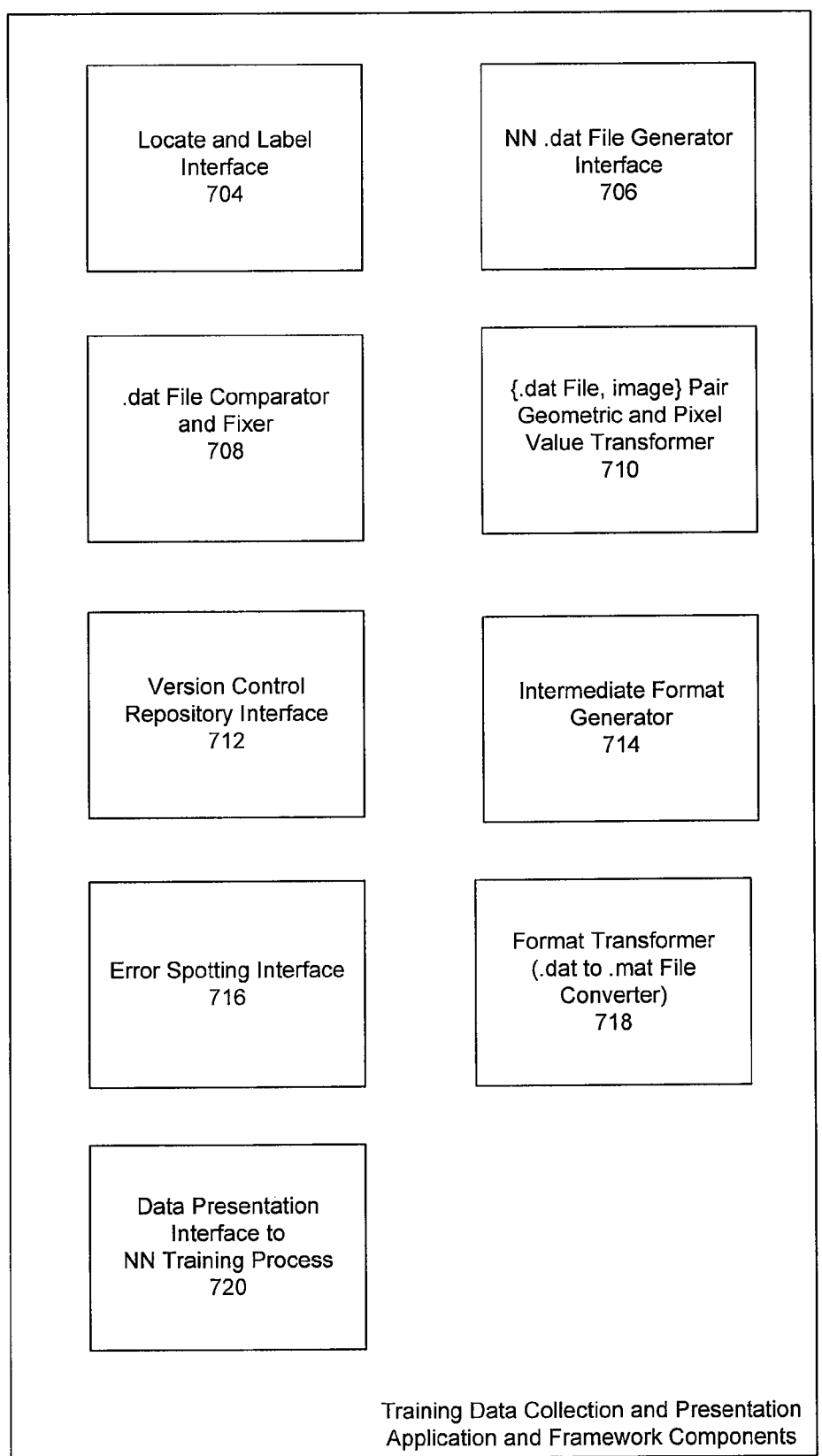
FIG. 7 is a block diagram of the components that perform the training process illustrated in component 302 of FIG. 3.
Figure 10:
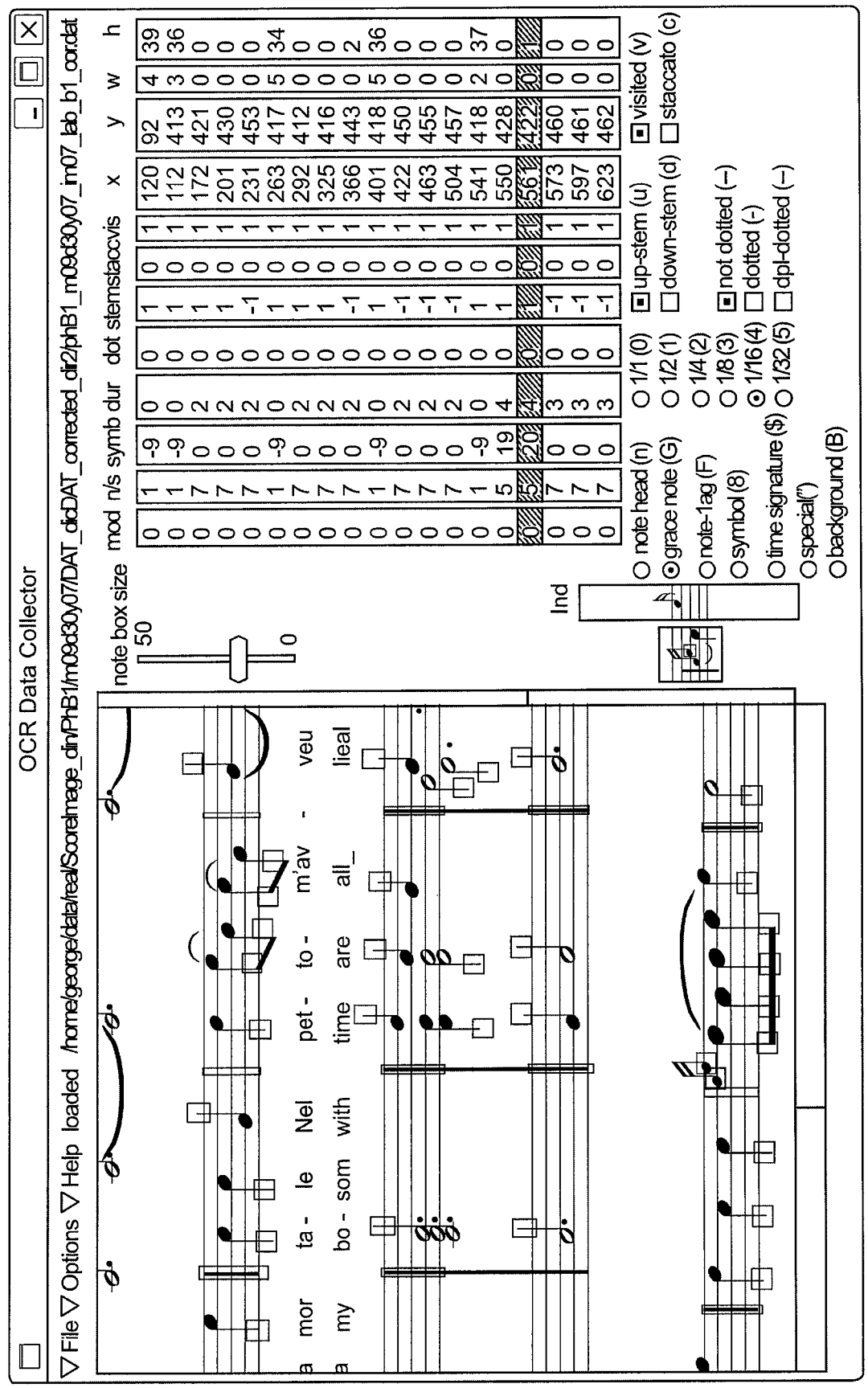
Figure 11:
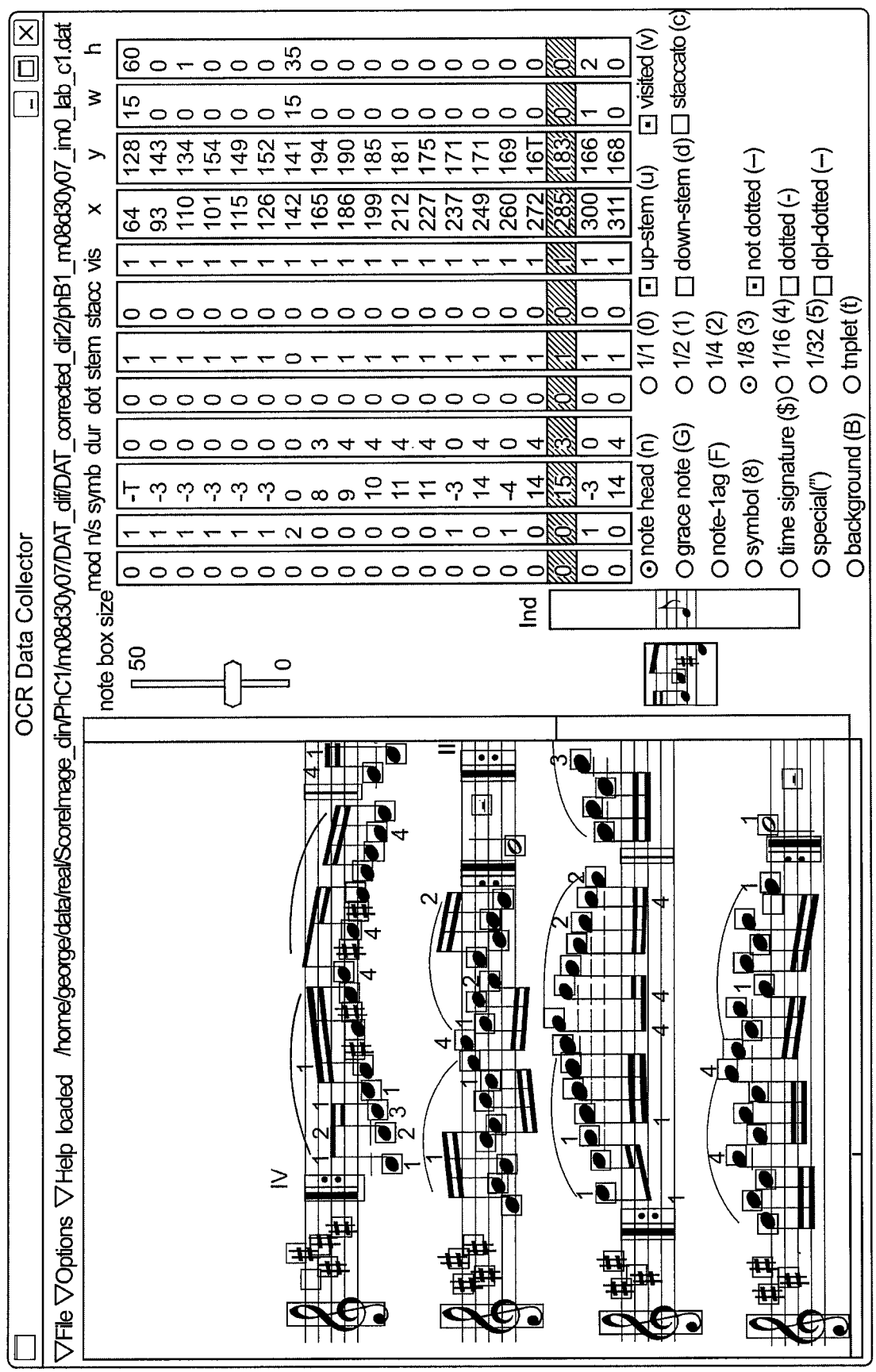
Figure 12:
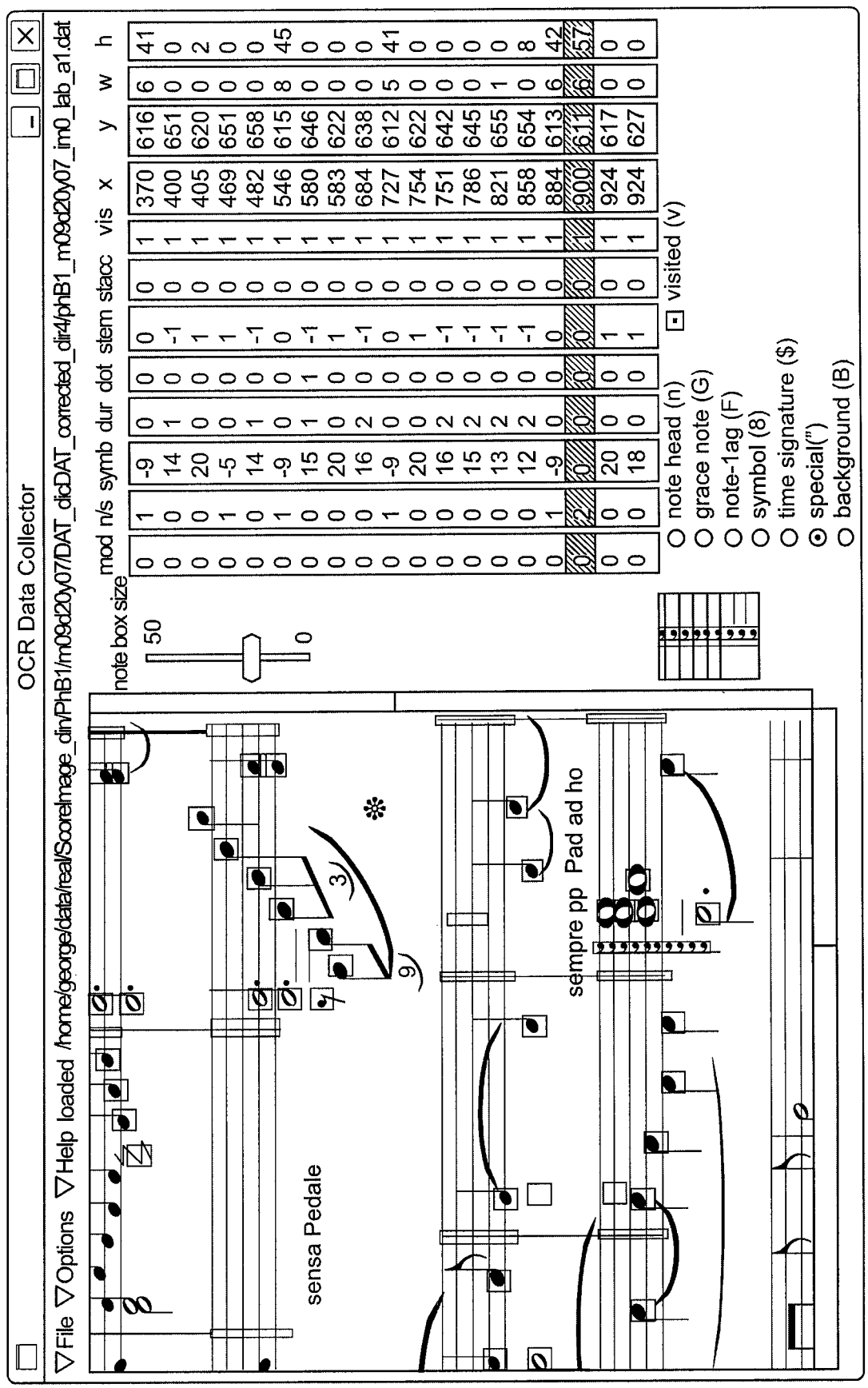
Figure 13:
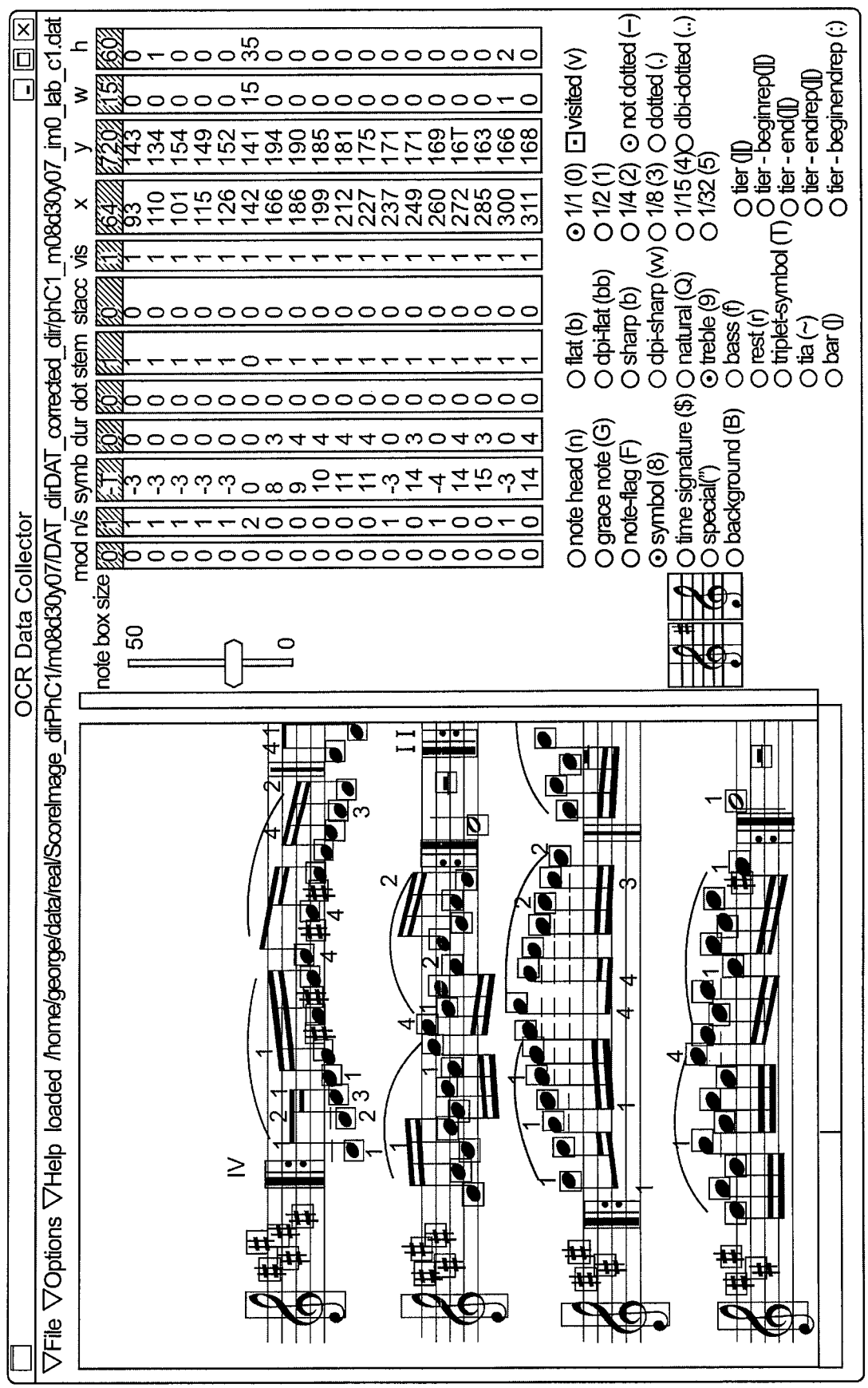

The functions and operations described above in connection with creating a training data set and presenting it to the NN for training can be performed by a software application executing on a computer having sufficient resources to perform the features described herein. Such a computer performs the operations illustrated in FIG. 3. The computer performing the training functions and operations may be the same computer as a computer for the OCR processor 102 or may be a different computer. FIG. 7 illustrates the construction of the training data set creation and presentation component 702, which can be provided as one or more modules or components that are incorporated into a single application, or can be provided as one or more separate applications or routines that cooperate as a suite and perform their respective functions while providing output suitable for use by the other applications or routines of the suite.

The training data set creation and presentation component 702 includes a locate and label application 704 through which a user can specify artifact location and label information to generate a new .dat file or revise an existing one. An interface to a previously trained NN 706 provides another means of generating .dat files, complete with location and label information about the processed image. A .dat comparator and fixer 708 component performs .dat file comparison and correction functions for revising the data representation of a single image. A geometric and pixel value transformer 710 maps an image and its corresponding .dat file to the standard image space in which the training data set is ultimately created. A version control repository interface 712 protects the data representation from modifications to software or user accident and facilitates decentralized data collection. An intermediate data format generator 714 combines multiple pairs of .dat files and images into a format constituting multiple images and their labels. An error-spotting interface 716 component performs the inspection and revision functions on the above described representation of multiple images and labels. A .dat-to-.mat format transformer 718 component performs both the functions of transforming multiple .dat files into a single mat file, and concatenating multiple mat files to form a data set. A data set presentation interface 720 imposes statistics such as frequency and order on the data set elements, and relates these data elements to a module that implements a NN training algorithm.

The process of generating and presenting a data set to a NN as described above contains fine-grained controls sufficient to specify, revise, transform and relate symbolic representations of complicated image structure. The process described herein has the flexibility necessary to adapt formats, transformation functions, and data revision procedures in a modular manner that preserves the integrity of the overall framework. These combined qualities of fine control and flexibility lend applicability of the process described herein to tasks other than music score OCR. In particular, the framework described herein could be utilized for OCR of other symbol-based languages that contain a known set of characters or character structural elements. As applied to such tasks, a NN utilizing the framework can attach labels to the language symbols of input data just as the system described herein is utilized to attach labels to music artifacts of the input data.

Exemplary Implementations

The systems and methods described above may be implemented in a number of ways. One such implementation includes various electronic components. For example, units of the various systems may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 16:
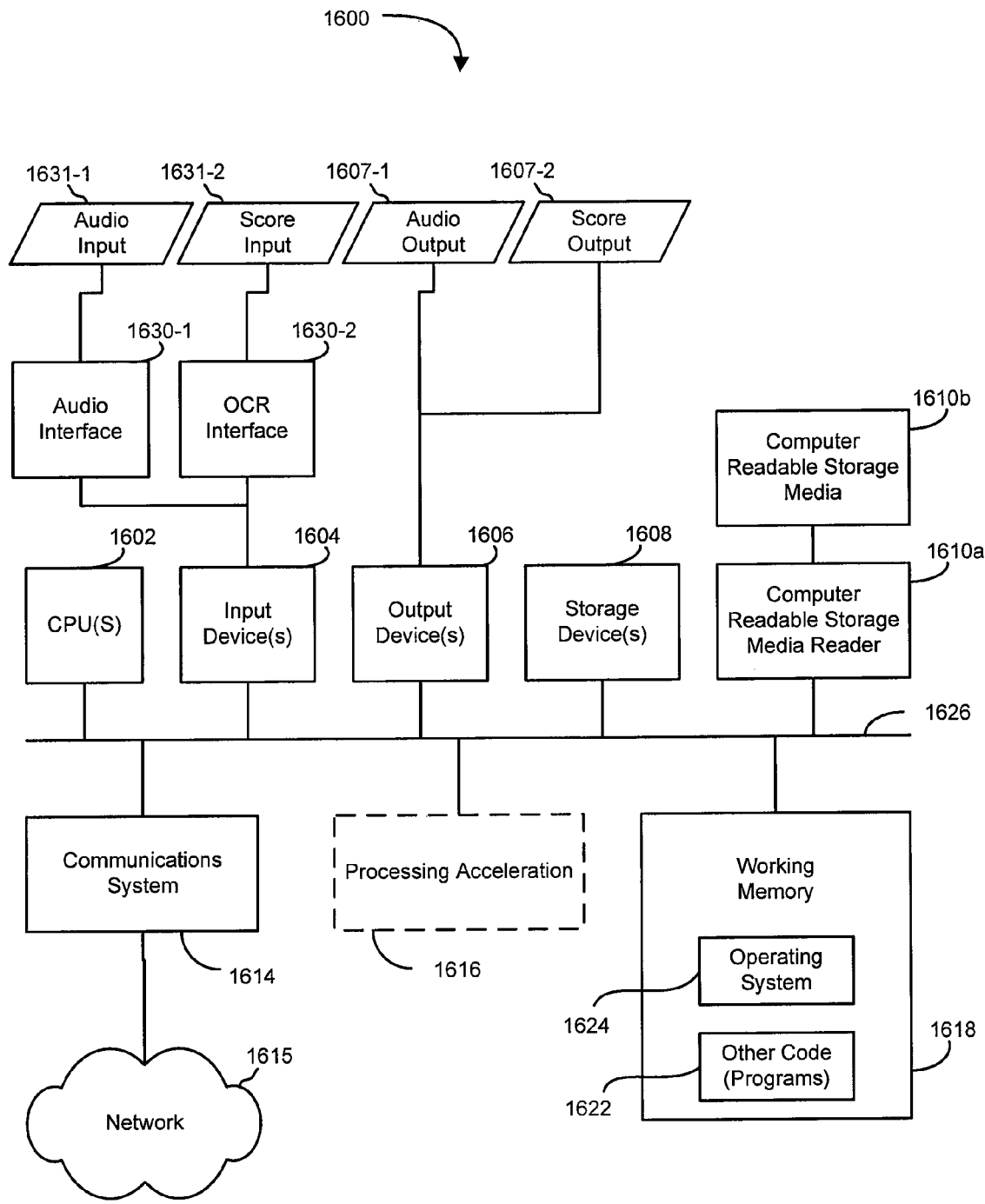
FIG. 16 is a block diagram of a computational system for implementing certain embodiments of the invention.

FIG. 16 provides a block diagram of a computational system 1600 for implementing embodiments of the invention. In one embodiment, the computation system 1600 may function as the OCR processor 102 shown in FIG. 1. In another embodiment it may function as the training processor of FIG. 3 and FIG. 7. It should be noted that FIG. 16 is meant only to provide a generalized illustration of various components, any or all of which may be utilized as appropriate. FIG. 16, therefore, broadly illustrates how individual system elements may be implemented in a relatively separated or relatively more integrated manner.

The computational system 1600 is shown comprising hardware elements that can be electrically coupled via a system bus 1626 (or may otherwise be in communication, as appropriate). The hardware elements can include one or more central processor units (CPUs) 1602, including without limitation one or more general-purpose processors and/or one or more special-purpose processors (such as digital signal processing chips, graphics acceleration chips, and/or the like); one or more input devices 1604, which can include, without limitation, a mouse, a keyboard, and/or the like; and one or more output devices 1606, which can include without limitation a display device, a printer, and/or the like.

The computational system 1600 may further include (and/or be in communication with) one or more storage devices 1608, which can comprise, without limitation, local and/or network accessible storage and/or can include, without limitation, a disk drive, a drive array, an optical storage device, solid-state storage device such as a random access memory ("RAM"), and/or a read-only memory ("ROM"), which can be programmable, flash-updateable, and/or the like. The computational system 1600 might also include a communications subsystem 1614, which can include without limitation a modem, a network card (wireless or wired), an infra-red communication device, a wireless communication device and/or chipset (such as a Bluetooth device, an 802.11 device, a WiFi device, a WiMax device, cellular communication facilities, etc.), and/or the like. The communications subsystem 1614 may permit data to be exchanged with a network 1615, and/or any other devices described herein. The network 1615 may comprise a local area network (LAN) or a network such as the Internet, or a combination. In many embodiments, the computational system 1600 will further include a working memory 1618, which can include a RAM or ROM device, as described above. The system may optionally include processing acceleration 1616 to assist with processing, such as arithmetic computations, graphical computations, and the like.

The computational system 1600 also may comprise software elements, shown as being currently located within the working memory 1618, including an operating system 1624 and/or other code, such as one or more application programs 1622, which may comprise computer programs performing tasks and operations described above, and/or may be designed to implement methods in accordance with the invention and/or configure systems in accordance with the invention, as described herein. Merely by way of example, one or more procedures described with respect to the method(s) discussed above might be implemented as code and/or instructions executable by a computer (and/or a processor within a computer). In one embodiment, the data generating and presenting operations are implemented as application programs 1622. In the description herein, references to "interface" and "processor" and "application" should be understood as referring to hardware, software, and combinations of the two, either as independent components (hardware, software, and/or both) for each interface, processor, or application, or as integrated components combined with one or more other components.

A set of these instructions and/or code may be stored on a computer readable storage medium 1610*b*. In some embodiments, the computer readable storage medium 1610*b* may comprise the storage device(s) 1608 described above. In other embodiments, the computer readable storage medium 1610*b* might be incorporated within the computer system. In still other embodiments, the computer readable storage medium 1610*b* might be separate from the computer system (i.e., it may be a removable readable medium, such as a compact disc, etc.), and or might be provided in an installation package, such that the storage medium can be used to program a general purpose computer with the instructions/code stored thereon. These instructions might take the form of executable code, which is executable by the computational system 1600 and/or might take the form of source and/or installable code, which, upon compilation and/or installation on the computational system 1600 (e.g., using any of a variety of generally available compilers, installation programs, compression/decompression utilities, etc.), then takes the form of executable code. In these embodiments, the computer readable storage medium 1610*b* may be read by a computer readable storage media reader 1610*a*.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In some embodiments, one or more of the input devices 1604 may be coupled with an audio interface 1630-1. The audio interface 1630-1 may be configured to receive a music contribution 1631-1 by interfacing with a microphone, instrument, digital audio device, or other audio signal or file source, for example physically, optically, electromagnetically, and the like. In other embodiments, one or more of the input devices 1604 may be coupled with a score optical interface 1630-2. The score optical interface 1630-2 may be configured to receive a score contribution 1631-2 by interfacing with a camera, scanner, digital imaging device, or other digital image source.

Further, in some embodiments, one or more of the output devices 1606 may be coupled with an audio output device 1607-1. The audio output device 1607-1 may be configured to output audio signal data generated by embodiments of the invention to one or more systems or devices capable of handling that data, for example a speaker, audio component, digital-to-analog converter, compact disc writer, and the like. In other embodiments, one or more of the output devices 1606 may be coupled with a score output device 1607-2. The score output device 1607-2 may be configured to output score representation data generated by embodiments of the invention to one or more systems or devices capable of handling that data, for example score transcription software, score publication systems, file storage devices, and the like.

In one embodiment, the invention employs a computer system (such as the computational system 1600) to perform methods of the invention. According to a set of embodiments, some or all of the procedures of such methods are performed by the computational system 1600 in response to processor 1602 executing one or more sequences of one or more instructions (which might be incorporated into the operating system 1624 and/or other code, such as an application program 1622) contained in the working memory 1618. Such instructions may be read into the working memory 1618 from another machine-readable medium, such as one or more of the storage device(s) 1608 (or 1610). Merely by way of example, execution of the sequences of instructions contained in the working memory 1618 might cause the processor(s) 1602 to perform one or more procedures of the methods described herein.

The terms "machine readable medium" and "computer readable medium," as used herein, refer to any medium that participates in providing data that causes a machine to operate in a specific fashion. In an embodiment implemented using the computational system 1600, various machine-readable media might be involved in providing instructions/code to processor(s) 1602 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) (1608 or 1610). Volatile media includes, without limitation, dynamic memory, such as the working memory 1618. Transmission media includes coaxial cables, copper wire, and fiber optics, including the wires that comprise the bus 1626, as well as the various components of the communication subsystem 1614 (and/or the media by which the communications subsystem 1614 provides communication with other devices). Hence, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 1602 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computational system 1600. These signals, which might be in the form of electromagnetic signals, acoustic signals, optical signals, and/or the like, are all examples of carrier waves on which instructions can be encoded, in accordance with various embodiments of the invention.

The communications subsystem 1614 (and/or components thereof) generally will receive the signals, and the bus 1626 then might carry the signals (and/or the data, instructions, etc. carried by the signals) to the working memory 1618, from which the processor(s) 1602 retrieves and executes the instructions. The instructions received by the working memory 1618 may optionally be stored on a storage device 1608 either before or after execution by the processor(s) 1602.

The present invention has been described above in terms of a presently preferred embodiment so that an understanding of the present invention can be conveyed. There are, however, many configurations for image data collection and neural network training systems not specifically described herein but with which the present invention is applicable. The present invention should therefore not be seen as limited to the particular embodiments described herein, but rather, it should be understood that the present invention has wide applicability with respect to music score image capture and neural network training systems generally. All modifications, variations, or equivalent arrangements and implementations that are within the scope of the attached claims should therefore be considered within the scope of the invention.

We claim:

1. A method of processing images with a trained Optical Character Recognition (OCR) system at a computer system, the method comprising:

generating a training, set of data that associates a label corresponding to each symbol artifact of each of one or more symbol artifacts in the images with determined locations of the symbol artifacts with the images at the computer system; and presenting the training set of data to a neural network of the trained OCR system for training;

wherein generating the training set of data further comprises producing a modified data file from a single image revision operation in which two or more locate-label data files are processed, such that each locate-label data file specifies an artifact location and a corresponding label for artifacts in the images, such that the single image revision operation resolves any discrepancy between the locate-label data files in which different labels are specified for a given artifact in the images by specifying one label across all the locate-label data files for the given artifact in the modified data file, and producing one or more corrected data files from a multiple image revision operation in which two or more modified data files are processed such that the multiple image revision operation resolves any discrepancy between the modified data files, such that the one or more corrected data files having changed labels for any outlier artifact-label pair comprise the training set of data.

2. A method as in claim 1, wherein generating a training set of data comprises:

identifying and correcting errors in the location and label data of artifacts in each of the images;

generating and transforming data formats representing symbology for a single image and multiple images;

generating location and label representations for all artifacts in each image, by interpreting and transforming data from the output of a trained OCR system; and geometrically transforming the data to a specified data space, producing a data space representation having persistence and inviolability to image and location data; and storing, the data space representation in a version control repository.

3. A method as in claim 1, wherein:

generating a training set of data comprises performing a geometric transformation on each of a plurality of data files, each of which corresponds to a processed image, such that scale and orientation of the images is consistent across the plurality of data files.

4. A method as in claim 3, wherein the data the comprises a Located space of the images and the training set of data corresponds to an Ultimate space of the images.

5. A computer system for training a neural network of a trained Optical Character Recognition (OCR) system, the computer system comprising:

a processor of the computer system;

a data set creation application that is executed by the processor and determines a location for each of one or more symbol artifacts in the images and identifies a corresponding label for each of the symbol artifacts and generates a training set of data that associates the identified labels and determined locations of the symbol artifacts with the images: and a data set presentation application that is executed by the processor and provides data set elements from a training set of data to a Neural Network training process of the trained OCR system;

wherein the data set creation application performs operations comprising producing, a modified data file from a single image revision operation in which two or more locate-label data files are processed, such that each locate-label data file specifies an artifact location and a corresponding label for artifacts in the images, such that the single image revision operation resolves any discrepancy between the locate-label data files in which different labels are specified for a given artifact in the image by specifying one label across all the locate-label data files for the given artifact in the modified data file, and producing one or more corrected data files from a multiple image revision operation in which two or more modified data files are processed such that the multiple image revision operation resolves any discrepancy between the modified data files, such that the one or more corrected data files having changed labels for any outlier artifact-label pair comprise the training set of data.

6. A computer system as in claim 5, wherein the data set creation application comprises:

a user interface through which a user determines locations for each of one or more symbol artifacts in the digital image and provides a corresponding label of the symbol artifacts in the digital image, a user interface through which a user identifies and corrects errors in the location and label data attributed to artifacts in a displayed set of image samples, an interface configured to generate a data format representing symbology for a single image, manipulate these single image formats to generate an intermediate multiple image format for an error detection application, and transform single image formats into a data set for training the Neural Network, an interface to accept data from the output of a trained OCR system and generate location and label representations for all artifacts in an image processed by the OCR system, and an interface through which a user submits files that contain image and artifact location data, and specifies a geometrical transformation through which the data is mapped and subsequently stored by an external version control application.

7. A computer system as in claim 5, wherein the data set creation application determines a location for each of one or more symbol artifacts in the images and identifies a corresponding label for each of the symbol artifacts and generates a data file for the images, and generates the training set of data by performing a geometric transformation on each of a plurality of data files, each of which corresponds to a processed image, such that scale and orientation of the images is consistent across the plurality of data files.

8. A computer system as in claim 7, wherein the data file comprises a Located space of the image and the training set of data corresponds to an Ultimate space of the image.

9. A computer system comprising:

a processor;

a user interface;

a memory that communicates with the processor and supports an object-oriented framework that provides a user-extensible neural network (NN) training mechanism that receives user input through the user interface to associate labels with artifacts contained in one or more digital images according to locations within the images, that produces a training set of data for the neural network. and that presents data set elements to a NN training process, the framework including:

a user-extensible image class defining at least one input image object to be processed;

a user-extensible training label class defining at least one training label object to be generated in accordance with the processed input image object;

a set of object methods that operate on the input image object and receive a user designation as an active artifact and label associated with the active artifact, and determine a corresponding location in the input image object of the active artifact;

a set of object methods that operate on a set of image samples corresponding to artifacts extracted from a set of image objects, that simultaneously display multiple image samples, and receive a user designation to revise location and label data for an image sample;

a set of object methods that operate on image and label objects to generate single and multiple image file formats, and reciprocal methods to populate image and label objects from single and multiple image file formats;

a set of user-extensible methods defining an interface to a trained OCR system that generate location and label representations for all artifacts in an image processed by the trained OCR system;

a set of user-extensible methods defining an interface to a version control system that provide geometrical transformation of file types containing image location information;

a user-extensible training data presentation class defining at least one data presentation object to be used in presenting a training set of data to the trained OCR system for Neural Network training;

wherein the set of object methods that operate on image and label objects to generate single and multiple image file formats perform operations comprising producing a modified data file from a single image revision operation in which two or more locate-label data files are processed, such that each locale-label data file specifies an artifact location and a corresponding label for artifacts in the images, such that the single image revision operation resolves any discrepancy between the locate-label data files in which different labels are specified for a given artifact in the images by specifying one label across all the locate-label data files for the given artifact in the modified data file, and producing one or more corrected data files from a multiple image revision operation in which two or more modified data files are processed such that the multiple image revision operation resolves any discrepancy between the modified data files, such that the one or more corrected data files having changed labels for any outlier artifact-label pair comprise the training set of data.

10. A method as in claim 1, wherein producing a corrected data file comprises identifying an artifact-label pair in one of the modified data files as an outlier artifact-label pair, wherein the label of the outlier artifact-label pair is inconsistent with the label of similar artifacts in the modified data files and the label of the outlier artifact-label pair is changed to be consistent with the label of similar artifacts in the modified data files.

11. A method as in claim 10, wherein identifying an artifact-label pair is performed using an error-spotting interface of the computer system.

12. A computer system as in claim 5, wherein the data set creation application is further configured to perform operations for producing a corrected data file that comprise identifying, an artifact-label pair in one of the modified data files as an outlier artifact-label pair, wherein the label of the outlier artifact-label pair is inconsistent with the label of similar artifacts in the modified data files and the label of the outlier artifact-label pair is changed to be consistent with the label of similar artifacts in the modified data files.

13. A computer system as in claim 12, wherein identifying an artifact-label pair is performed using an error-spotting interface of the computer system.

14. A computer system as in claim 9, wherein the performed operations of the set of object methods further comprise identifying an artifact-label pair in one of the modified data files as an outlier artifact-label pair, wherein the label of the outlier artifact-label pair is inconsistent with the label of similar artifacts in the modified data files and the label of the outlier artifact-label pair is changed to he consistent with the label of similar artifacts in the modified data files.

15. A computer system as in claim 14, wherein identifying an artifact-label pair is performed using an error-spotting interface of the computer system.

16. A computer system as in claim 9, wherein the performed operations of the set of object methods further comprise determining a location for each of one or more symbol artifacts in the images and identifying a corresponding label for each of the symbol artifacts and generating a data file for the images, and generating a training set of data by performing a geometric transformation on each of a plurality of data files, each of which corresponds to a processed image, such that scale and orientation of the images is consistent across the plurality of data files.

17. A computer system as in claim 16, wherein the data file comprises a Located space of the images and the training set of data corresponds to an Ultimate space of the images.

18. A method of processing images with a trained Optical Character Recognition (OCR) system at a computer system, the method comprising:

receiving a plurality of output data files produced as output of the trained OCR system, the output data files comprising locate-label data files;

generating a training set of data that associates a label corresponding to each symbol artifact of one or more symbol artifacts in the images with determined locations of the symbol artifacts with the images at the computer system; and presenting the training set of data to a neural network of the trained OCR system for training;

wherein generating the training set of data further comprises:

producing a modified data file from a single image revision operation in which two or more locate-label data files are processed, such that each locate-label data file specifies an artifact location and a corresponding label for artifacts in the images, such that the single image revision operation resolves any discrepancy between the locate-label data files in which different labels are specified for a given artifact in the images by specifying one label across all the locate-label data files for the given artifact in the modified data file; and producing one or more corrected data files from a multiple image revision operation in which two or more modified data files are processed such that the multiple image revision operation resolves any discrepancy between the modified data files;

such that the one or more corrected data files having changed labels for any outlier artifact-label pair comprise the training set of data.

19. A method as in claim 18, wherein the symbol artifacts in the images comprise musical artifacts.

20. A method as in claim 1, wherein the symbol artifacts in the images comprise musical artifacts.

21. A computer system as in claim 5, wherein the symbol artifacts in the images comprise musical artifacts.

22. A computer system as in claim 9, wherein the symbol artifacts in the images comprise musical artifacts.

23. A computer system for processing images, the computer system comprising:
- a processor of the computer system;
- a data set creation application that is executed by the processor and that receives a plurality of output data files produced as output of a trained Optical Character Recognition (OCR) system, the trained OCR system having been presented with a training set of data, wherein each of the output data files is associated with an image and associates a label corresponding to each symbol artifact of each of one or more symbol artifacts in the associated image with determined locations of the symbol artifacts in the associated image, and wherein the data set creation application produces one or more corrected data files such that the corrected data files resolve any discrepancy between each output data file and one or more data files corresponding to the same associated image in which different labels are specified for a given artifact in the images by specifying one label for the given artifact in the corrected data file; and
- a data set presentation application that receives the one or more corrected data files and provides a training set of data set elements to a Neural Network training process of the trained OCR system.

24. A method of processing images, the method comprising:
- receiving a plurality of output data files produced as output of a trained Optical Character Recognition (OCR) system, the trained OCR system having been presented with a training set of data, wherein each of the output data files is associated with an image and associates a label corresponding to each symbol artifact of each of one or more symbol artifacts in the associated image with determined locations of the symbol artifacts in the associated image;
- producing one or more corrected data files such that the corrected data files resolve any discrepancy between each output data file and one or more data files corresponding to the same associated image in which different labels are specified for a given artifact in the images by specifying one label for the given artifact in the corrected data file; and
- receiving the one or more corrected data files and providing a training set of data set elements to a Neural Network training process of the trained OCR system.

25. A computer system for processing images the computer system comprising:
- a processor of the computer system;
- a data set creation application that is executed by the processor and that receives a plurality of output data files produced as output of a trained Optical Character Recognition (OCR) system, the trained OCR system having been presented with a training set of data, wherein each of the output data files is associated with an image and associates a label corresponding to each symbol artifact of each of one or more symbol artifacts in the associated image with determined locations of the symbol artifacts in the associated image, and wherein the data set creation application produces one or more corrected data files such that the corrected data files resolve any discrepancy between the image artifacts for a given label in the output data files by specifying one label in the corrected data files for the image artifacts of corresponding image content; and
- a data set presentation application that receives the one or more corrected data files and provides a training set of data set elements to a Neural Network training process of the trained OCR system.

26. A method of processing images, the method comprising:
- receiving a plurality of output data files produced as output of a trained Optical Character Recognition (OCR) system, the trained OCR system having been presented with a training set of data, wherein each of the output data files is associated with an image and associates a label corresponding to each symbol artifact of each of one or more symbol artifacts in the associated image with determined locations of the symbol artifacts in the associated image;
- producing one or more corrected data files such that the corrected data files resolve any discrepancy between the image artifacts for a given label in the output data files by specifying one label in the corrected data files for the image artifacts of corresponding image content; and
- receiving the one or more corrected data files and providing a training set of data set elements to a Neural Network training process of the trained OCR system.

\* \* \* \* \*